United States Patent
Fukushima et al.

(10) Patent No.: US 10,720,627 B2
(45) Date of Patent: Jul. 21, 2020

(54) EXTERNAL CONNECTION BUS BAR HOLDING MODULE AND BATTERY CONNECTION MODULE

(71) Applicants: AUTONETWORKS TECHNOLOGIES, LTD, Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Seishi Kimura, Mie (JP); Mitsutoshi Morita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 2 days.

(21) Appl. No.: 16/077,643

(22) PCT Filed: Mar. 14, 2017

(86) PCT No.: PCT/JP2017/010088
§ 371 (c)(1),
(2) Date: Aug. 13, 2018

(87) PCT Pub. No.: WO2017/163995
PCT Pub. Date: Sep. 28, 2017

(65) Prior Publication Data
US 2019/0051883 A1    Feb. 14, 2019

(30) Foreign Application Priority Data

Mar. 25, 2016  (JP) ................... 2016-061585
Sep. 6, 2016   (JP) ................... 2016-173325
Dec. 15, 2016  (JP) ................... 2016-243194

(51) Int. Cl.
H01M 2/24      (2006.01)
H01M 2/20      (2006.01)
(Continued)

(52) U.S. Cl.
CPC .......... *H01M 2/206* (2013.01); *B60R 16/033* (2013.01); *H01M 2/1077* (2013.01);
(Continued)

(58) Field of Classification Search
CPC .. H01M 2/206; H01M 2/1077; H01M 10/482; H01M 2220/20
See application file for complete search history.

(56) References Cited

U.S. PATENT DOCUMENTS 9,960,401 B2    5/2018  Takase et al.
2004/0043663 A1 3/2004  Ikeda et al.
(Continued)

FOREIGN PATENT DOCUMENTS

JP    2004-095381    3/2004
JP    2004-362997    12/2004
(Continued)

OTHER PUBLICATIONS

Official Communication issued in International Bureau of WIPO Patent Application No. PCT/JP2017/010088, dated May 30, 2017.

*Primary Examiner* — Jane J Rhee
(74) *Attorney, Agent, or Firm* — Greenblum & Bernstein, P.L.C.

(57) ABSTRACT

An external connection bus bar holding module includes: a first external connection bus bar, a second external connection bus bar, a first protector portion that holds a first electrode connection portion of the first external connection bus bar, a second protector portion that is arranged at an
(Continued)

interval from the first protector portion and holds the first external connection portion of the first external connection bus bar, and an intermediate protector portion. The intermediate protector portion is located between the first protector portion and the second protector portion and holds an intermediate portion of the first external connection bus bar between the first protector portion and the second protector portion.

13 Claims, 20 Drawing Sheets

(51) Int. Cl.
*H01R 11/28* (2006.01)
*H01M 10/48* (2006.01)
*H01M 2/10* (2006.01)
*B60R 16/033* (2006.01)

(52) U.S. Cl.
CPC ........ *H01M 10/482* (2013.01); *H01R 11/283* (2013.01); *H01M 2220/20* (2013.01)

(56) References Cited

U.S. PATENT DOCUMENTS

| | | |
|---|---|---|
| 2006/0183367 A1 | 8/2006 | Saito et al. |
| 2015/0070025 A1 | 3/2015 | Nakayama et al. |
| 2016/0197330 A1 | 7/2016 | Takase et al. |

FOREIGN PATENT DOCUMENTS

| | | |
|---|---|---|
| JP | 2006-222043 | 8/2006 |
| JP | 2013-016381 | 1/2013 |
| JP | 2014-007105 | 1/2014 |
| JP | 2014-127229 | 7/2014 |

EXTERNAL CONNECTION BUS BAR HOLDING MODULE AND BATTERY CONNECTION MODULE

TECHNICAL FIELD

The technique disclosed in the present specification relates to an external connection bus bar holding module and a battery connection module that includes the holding module, and specifically relates to an external connection bus bar holding module that holds external connection bus bars that are connected to a pair of output electrode terminals for outputting power to an exterior of a power storage element group.

BACKGROUND ART

Conventionally, an external connection bus bar disclosed in Patent Document 1 has been known as an example of an external connection bus bar that is connected to output electrode terminals of a power storage element group. Patent Document 1 discloses external connection bus bars 19B that are connected to electrode terminals of power storage elements on both ends of a power storage element group, in a battery module (power storage module) M1 with a configuration in which a pair of output electrode terminals are the electrode terminals of the power storage elements on both ends. In view of this, the external connection bus bars 19B are held by resin protectors 20 along with bus bars 19 that connect the electrode terminals of the power storage elements.

CITATION LIST

Patent Documents

Patent Document 1: JP 2014-127229A

SUMMARY OF INVENTION

Technical Problem

However, if the arrangement of the multiple power storage elements in the power storage element group is the same as in Patent Document 1 above, or in other words, if power storage elements with thin cuboid shapes are arranged in the thickness direction, power is supplied from the power storage element group to the external device via the external connection bus bars, from the same end side of the power storage element group in some cases. In this case, the external connection bus bar to be connected to one of the pair of output electrode terminals needs to be disposed over a long distance to the other end of the power storage element group. In this case, two types of external connection bus bars with different shapes are needed, and two types of external connection bus bar insulating protectors (holding modules) corresponding thereto are needed. At this time, the insulating protectors need to be separately attached to the power storage element group, and the task of attaching the insulating protectors requires labor. For this reason, there has been desire for a technique according to which it is possible to adapt to any position of power extraction of the power storage element group and according to which attachment of the insulating protectors to the power storage element group can be performed easily when multiple external connection bus bars with different shapes are to be held.

The technique disclosed in the present specification has been completed based on the above-described circumstance, and provides an external connection bus bar holding module that can be adapted to any position of power extraction from a power storage element group and can easily be attached to a power storage element group, and a battery connection module including the holding module.

Solution to the Problem

An external connection bus bar holding module disclosed in the present specification is an external connection bus bar holding module to be attached to a power storage element group composed of a plurality of power storage elements including positive and negative electrode terminals, wherein the power storage element group includes a first output electrode terminal configured to output power of one polarity and a second output electrode terminal configured to output power of another polarity, and the module includes: a first external connection bus bar that includes a first electrode connection portion to be connected to the first output electrode terminal, a first external connection portion to be connected to an external device, and an intermediate portion located between the first electrode connection portion and the first external connection portion; a second external connection bus bar that includes a second electrode connection portion to be connected to the second output electrode terminal and a second external connection portion to be connected to the external device; a first protector portion that holds the first electrode connection portion of the first external connection bus bar; a second protector portion that is arranged at an interval from the first protector portion and holds the first external connection portion of the first external connection bus bar; and an intermediate protector portion that is located between the first protector portion and the second protector portion and holds the intermediate portion of the first external connection bus bar between the first protector portion and the second protector portion.

According to the present configuration, the external connection bus bar holding module is constituted by three protector portions, namely a first protector portion, a second protector portion, and an intermediate protector portion. For this reason, for example, the length (shape) of the intermediate portion of the first external connection bus bar and the length (shape) of the intermediate protector portion are adapted to the power extraction position of the power storage element group, whereby the external connection bus bar holding module can be adapted to any position of power extraction of the power storage element group. Also, the first protector portion and the second protector portion are configured to be joined by the intermediate protector portion, whereby the external connection bus bar holding module can be integrated. For this reason, the task of attaching the external connection bus bar holding module to the power storage element group can be performed easily. That is, according to the external connection bus bar holding module of the present configuration, it is possible to apply the external connection bus bar holding module to any position of power extraction of the power storage element group, and attachment to the power storage element group can be performed easily.

With the above-described external connection bus bar holding module, the intermediate protector portion may be provided separately from the first protector portion and the second protector portion, and one end portion of the intermediate protector portion may be held by the first protector portion and another end portion is held by the second protector portion.

According to the present configuration, the external connection bus bar holding module is constituted by three individual protector portions, namely a first protector portion, a second protector portion, and an intermediate protector portion. For this reason, for example, when the length of the intermediate portion of the first external connection bus bar is to be adapted to the power extraction position of the power storage element group, the first protector portion and the second protector portion can be used as-is, and the length of the intermediate protector portion can be adapted by merely changing the design.

Also, with the above-described external connection bus bar holding module, the intermediate protector portion may be constituted by synthetic resin that has been extrusion molded.

According to the present configuration, the intermediate protector is formed through extrusion molding, and therefore when the intermediate protector portion is formed, only one mold is needed, regardless of the length of the intermediate protector portion. Also, the length of the intermediate protector portion can be changed easily according to the number of power storage elements of the power storage element group. That is, among the three protectors, namely the first protector portion, the second protector portion, and the intermediate protector portion, the length of only the intermediate protector portion is changed, and thus it is possible to adapt to various types of power storage element groups with different numbers of power storage elements. For this reason, when the external connection bus bar holding module is adapted to various types of power storage element groups, further molds do not need to be created separately, and thus expenses can be reduced.

Also, with the above-described external connection bus bar holding module, the intermediate protector portion may be formed integrally with the first protector portion or the second protector portion, and one end portion of the intermediate protector portion may be held by the non-integrated first protector portion or second protector portion.

According to the present configuration, the intermediate protector portion is integrated with the first protector portion or the second protector portion. For this reason, the configuration for holding the first external connection bus bar can be simplified, and the configuration serving as the external connection bus bar holding module can be simplified.

Also, with the above-described external connection bus bar holding module, the intermediate protector portion may be formed integrally with the first protector portion and the second protector portion.

According to the present configuration, the intermediate protector portion is integrated with the first protector portion and the second protector portion. For this reason, the configuration for holding the first external connection bus bar can be further simplified, and the configuration serving as the external connection bus bar holding module can be further simplified.

With the above-described external connection bus bar holding module, the first output electrode terminal may be constituted by an electrode terminal of one polarity of a power storage element located at one end in the alignment direction of the plurality of power storage elements in the power storage element group, a second output electrode terminal may be constituted by an electrode terminal of another polarity of a power storage element located at another end in the alignment direction of the plurality of power storage elements in the power storage element group, the intermediate portion of the first external connection bus bar may have a shape that extends from the first electrode connection portion to the first external connection portion, and the second protector portion may hold the second external connection bus bar.

According to the present configuration, if the first output terminal and the second output terminal are arranged separated on both end portions in the alignment direction of the multiple power storage elements in the power storage element group, the position of the first external connection portion of the first external connection bus bar and the position of the second external connection portion of the second external connection bus bar are set on the other end side (the same end side) in the alignment direction of the multiple power storage elements in the power storage element group. For this reason, if the first output electrode terminal and second electrode output terminal are arranged separated on both end sides of the power storage element group, it is possible to easily and accurately realize a state in which the power extraction position of the power storage element group is located on one end side in the alignment direction of the multiple power storage elements in the power storage element group.

Also, a battery connection module disclosed in the present specification is a battery connection module to be attached to an upper portion of the power storage element group, and includes: one of the above-described external connection bus bar holding modules; a plurality of bus bars that connect the positive electrode terminals and the negative electrode terminals of the adjacent power storage elements; and an insulating protector that holds the plurality of bus bars, wherein the external connection bus bar holding module is arranged above the insulating protector.

According to the present configuration, with the battery connection module including the external connection bus bar holding module, it is possible to adapt to any position of power extraction of the power storage element group, and attachment of the external connection bus bar holding module to the power storage element group can be performed easily.

Also, the above-described battery connection module may furthermore include a cover that covers at least the first external connection bus bar excluding the first external connection portion, the second external connection bus bar excluding the second external connection portion, and the plurality of bus bars.

According to the present configuration, the battery connection module includes a cover that covers the first external connection bus bar excluding the first external connection portion, the second external connection bus bar excluding the second external connection portion, and the bus bars. For this reason, the two adjacent bus bars, that is, the first external connection bus bar and the second external connection bus bar can be prevented from short-circuiting due to an external metal or the like. Also, it is possible to suppress a case in which dust or the like enters the battery connection module.

ADVANTAGEOUS EFFECTS OF THE INVENTION

According to the external connection bus bar holding module disclosed in the present specification, it is possible to adapt to any position of power extraction of the power storage element group and attachment to the power storage element group can be performed easily.

DESCRIPTION OF EMBODIMENTS

Embodiment 1

Figure 3:
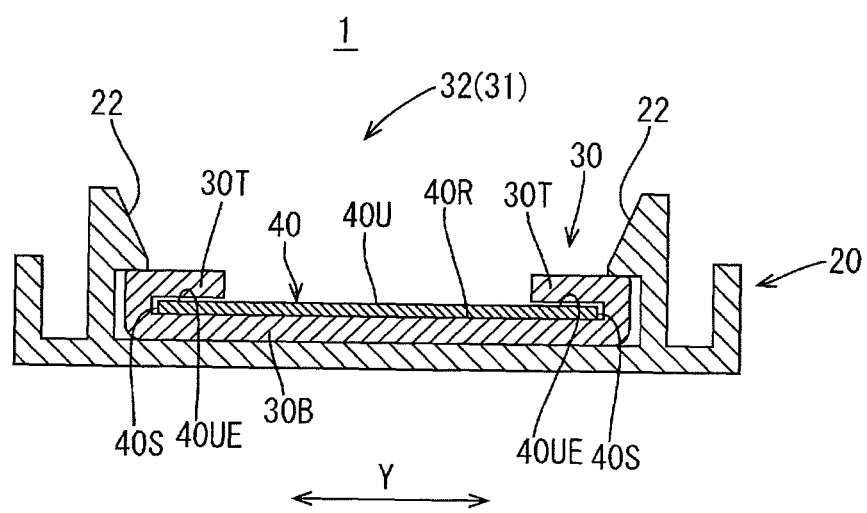
FIG. 3 is a partial cross-sectional view of an external connection bus bar holding module.

Embodiment 1 will be described with reference to FIGS. 1 to 8. Note that FIG. 3 is a cross-sectional view taken along line A-A in FIG. 1. The power storage module 100 shown in the present embodiment is mounted in a vehicle (not shown) such as an electric automobile or a hybrid automobile, and is used as a power source for driving the vehicle. Also, an external connection bus bar holding module 1 shown in the present embodiment is attached to the upper portion of the power storage module 100 (see FIG. 4). Note that in the following description, description will be given using the direction indicated by arrow X in FIGS. 1 and 4 as the left side and the direction indicated by arrow Y in FIG. 5 as upward. Also, regarding multiple identical members, in some cases, one member is denoted by a reference sign and the other members are not.

1. Configuration of External Connection Bus Bar Holding Module

Figure 1:
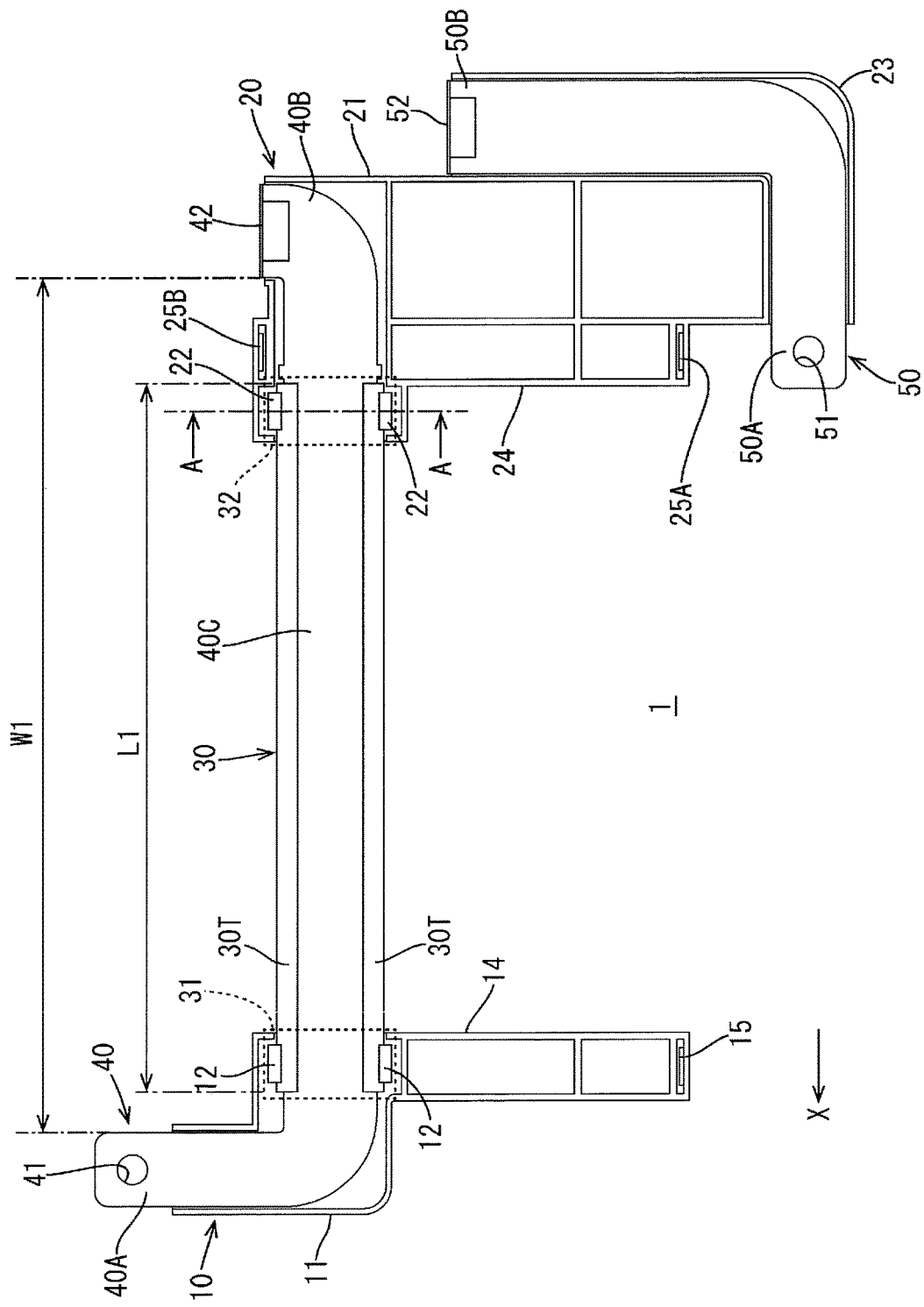
FIG. 1 is a plan view of an external connection bus bar holding module of Embodiment 1.
Figure 2:
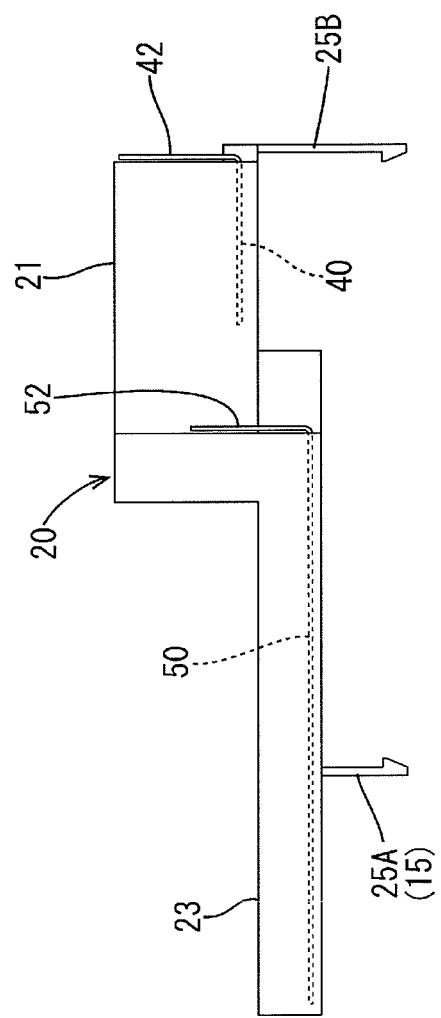
FIG. 2 is a side view of an external connection bus bar holding module.

As shown in FIG. 1, the external connection bus bar holding module 1 includes a first protector portion 10, a second protector portion 20, an intermediate protector portion 30, an anode external connection bus bar 40, and a cathode external connection bus bar 50.

Figure 4:
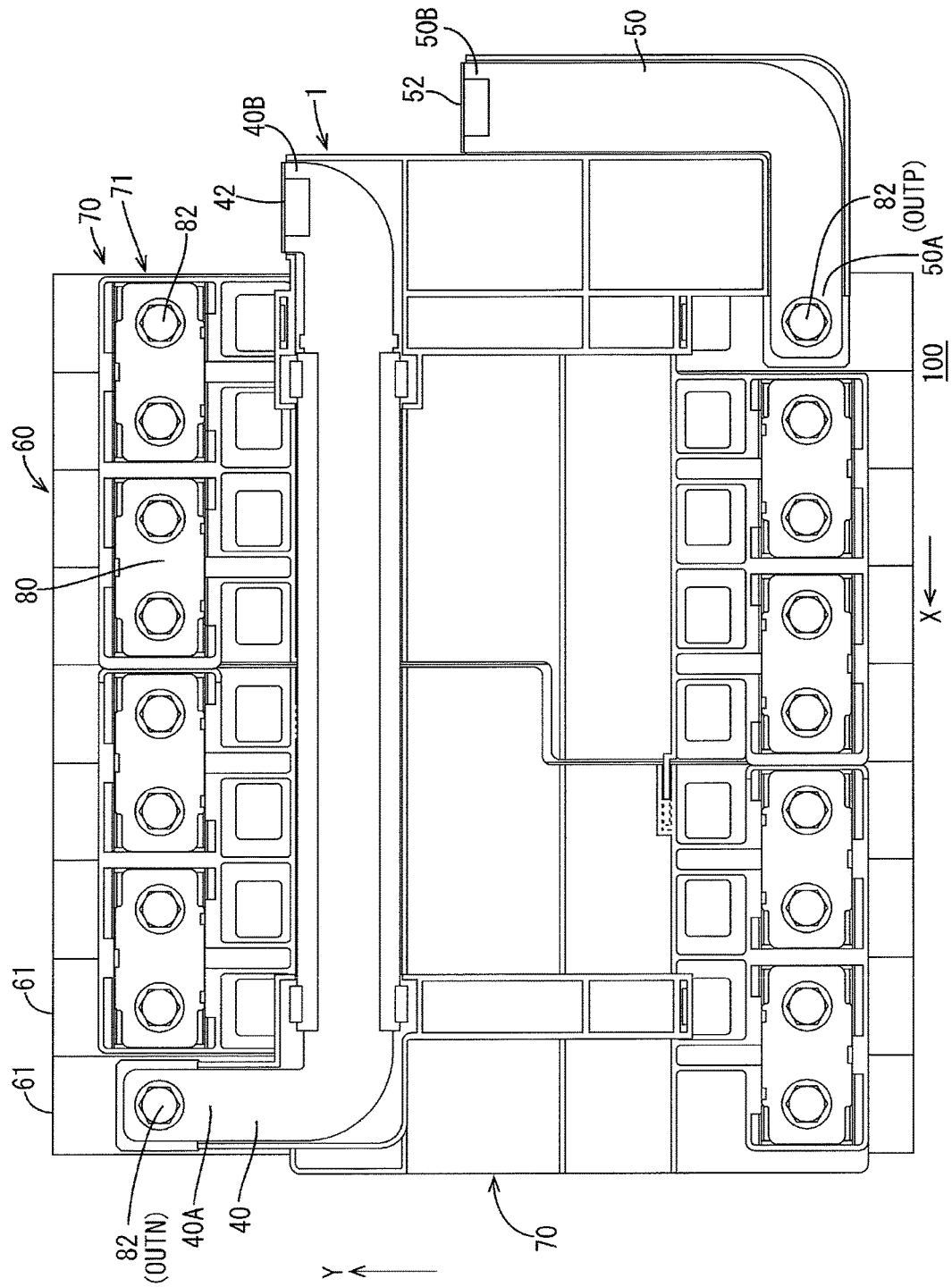
FIG. 4 is a plan view of a power storage module.

The anode external connection bus bar 40 is connected to an anode output terminal OUTN of a pair of output terminals (OUTP, OUTN) for outputting power to an external device, of the power storage element group 60 (see FIG. 4).

The anode external connection bus bar 40 has a flat plate shape (see FIG. 3). Specifically, as shown in FIG. 1, the anode external connection bus bar 40 includes a first electrode connection portion 40A that is connected to the anode output terminal OUTN of the power storage element group 60, a first external connection portion 40B that is connected to the external device to which the power is to be supplied from the power storage element group 60, and an intermediate portion 40C that is located between the first electrode connection portion 40A and the first external connection portion 40B. The anode external connection bus bar 40 is an example of a "first external connection bus bar". Here, for example, the intermediate portion 40C corresponds to the range indicated by arrow W in FIG. 1, the first electrode connection portion 40A corresponds to the portion to the left of the intermediate portion 40C, and the first external connection portion 40B corresponds to the portion to the right of the intermediate portion 40C. As shown in FIG. 1, the intermediate portion 40C has a shape that extends from the first electrode connection portion 40A to the first external connection portion 40B.

The first electrode connection portion 40A is provided with a through hole 41 for connecting the anode external connection bus bar 40 to the anode output terminal OUTN. Also, the first external connection portion 40B is provided with a first connection terminal portion 42 for connecting the anode external connection bus bar 40 to the external device.

As shown in FIG. 1, the cathode external connection bus bar 50 includes a second electrode connection portion 50A that is connected to a cathode output terminal OUTP of the power storage element group 60, and a second external connection portion 50B that is connected to the external device that is supplied with power from the power storage element group 60. The second electrode connection portion 50A is provided with a through hole 51 for connecting the cathode external connection bus bar 50 to the cathode output terminal OUTP.

Also, the second external connection portion 50B is provided with a second connection terminal portion 52 for connecting the cathode external connection bus bar 50 to the external device. The cathode external connection bus bar 50 is an example of a "second external connection bus bar". Note that there is no limitation to this, and conversely, the "first external connection bus bar" may be a cathode external connection bus bar and the "second external connection bus bar" may be an anode external connection bus bar. That is, the external connection bus bar 40 may be set as the cathode external connection bus bar and the external connection bus bar 50 may be set as the anode external connection bus bar according to the arrangement of the power storage elements 61 in the power storage element group 60.

The first protector portion 10 is made of an insulating member such as synthetic resin, and as shown in FIG. 1, includes a bus bar holding portion 11, first locking portions 12, an extended portion 14, a locking piece 15, and the like.

The bus bar holding portion 11 insulates and holds the first electrode connection portion 40A of the anode external connection bus bar 40. Specifically, a portion of the intermediate portion 40C of the anode external connection bus bar 40 is also held via a later-described first held portion 31 of the intermediate protector portion 30.

As shown in FIG. 1, a pair of the first locking portions 12 are provided in correspondence with the width of the intermediate protector portion 30 and lock the anode external connection bus bar 40 via the first held portion 31 of the intermediate protector portion 30 (see FIG. 3). Note that FIG. 3 shows a cross-section of the second held portion 32 of the later-described second protector portion 20, but a cross-section of the first held portion 31 of the first protector portion 10 is also shown since the configurations are the same.

The extended portion 14 is extended in the width direction of the intermediate portion 30C of the anode external connection bus bar 40 from the bus bar holding portion 11, and the locking piece 15 is formed on the leading end portion of the extended portion 14. The locking piece 15 engages with locking grooves 66 (see FIG. 6) formed on the later-described power storage elements 61, whereby the first protector portion 10, or in other words, the external connection bus bar holding module 1 is joined to the power storage element group 60.

The second protector portion 20 is made of an insulating member such as synthetic resin, similarly to the first protector portion 10, and as shown in FIG. 1, includes a first bus bar holding portion 21, second locking portions 22, a second bus bar holding portion 23, an extended portion 24, two locking pieces 25A and 25B, and the like. As shown in FIG. 1, the second protector portion 20 is arranged at a predetermined interval from the first protector portion 10.

The first bus bar holding portion 21 insulates and holds the first external connection portion 40B of the anode external connection bus bar 40. Specifically, part of the intermediate portion 40C of the anode external connection bus bar 40 is also held via a later-described second held portion 32 of the intermediate protector portion 30.

As shown in FIG. 1, a pair of the second locking portions 22 are provided in correspondence with the width of the intermediate protector portion 30 and lock the anode external connection bus bar 40 via the second held portion 32 of the intermediate protector portion 30 (see FIG. 3). Note that the shapes of the first locking portions 12 and the second locking portions 22 are not limited to the hook-type shapes with tapered cross-sections shown in FIG. 3.

A second bus bar holding portion 23 holds the cathode external connection bus bar 50. The extended portion 24 is extended in the width direction of the intermediate portion 30C of the anode external connection bus bar 40 from the first bus bar holding portion 21, and locking pieces 25A and 25B are formed on both end portions of the extended portion 24. The locking pieces 25A and 25B are engaged with the locking grooves 66 (see FIG. 6) formed on the later-described power storage elements 61, whereby the second protector portion 20, or in other words, the external connection bus bar holding module 1 is joined to the power storage element group 60.

The intermediate protector portion 30 is composed of an insulating member such as synthetic resin that elastically deforms, and in the present embodiment, it is formed through extrusion molding. The intermediate protector portion 30 has a shape that covers the lower surface 40R, both side portions 40S extending in the lengthwise direction, or in other words, both side portions 40S in the width direction (the direction indicated by arrow Y in FIG. 3), and both end portions 40UE extending the lengthwise direction of the upper surface 40U, or in other words, both end portions 40UE in the width direction, of the anode external connection bus bar 40 (see FIG. 3).

As shown surrounded by the broken lines in FIG. 1, the intermediate protector portion 30 includes the first held portion 31 (an example of "one end portion") that is held in the first protector portion 10, and the second held portion 32 (an example of "another end portion") that is held in the second protector portion 20. As shown in FIG. 3, in the second held portion 32, the end portions 30T of the intermediate protector portion 30 that cover the upper surface 40U of the anode external connection bus bar 40 are locked by the second locking portions 22 of the second protector portion 20.

Specifically, the end portions 30T of the intermediate protector portion 30 are inserted into the spaces between the bottom portion and the second locking portions 22 of the second protector portion 20, whereby the intermediate protector portion 30 is locked onto the second locking portions 22. Accordingly, the anode external connection bus bar 40 is locked by the second protector portion 20. Note that the locking configuration of the intermediate protector portion 30 and the second protector portion 20 at the second held portions 32 is a locking configuration that is similar for the intermediate protector portion 30 and the first protector portion 10 at the first held portion 31 as well, although this is not illustrated.

The intermediate protector portion 30 holds the anode external connection bus bar 40 between the first protector portion 10 and the second protector portion 20 at the first held portion 31 and the second held portion 32. That is, the anode external connection bus bar 40 is held overlapping with the first protector portion 10 at the first held portion 31 and overlapping with the second protector portion 20 at the second held portion 32.

2. Configuration of Power Storage Module

Figure 5:
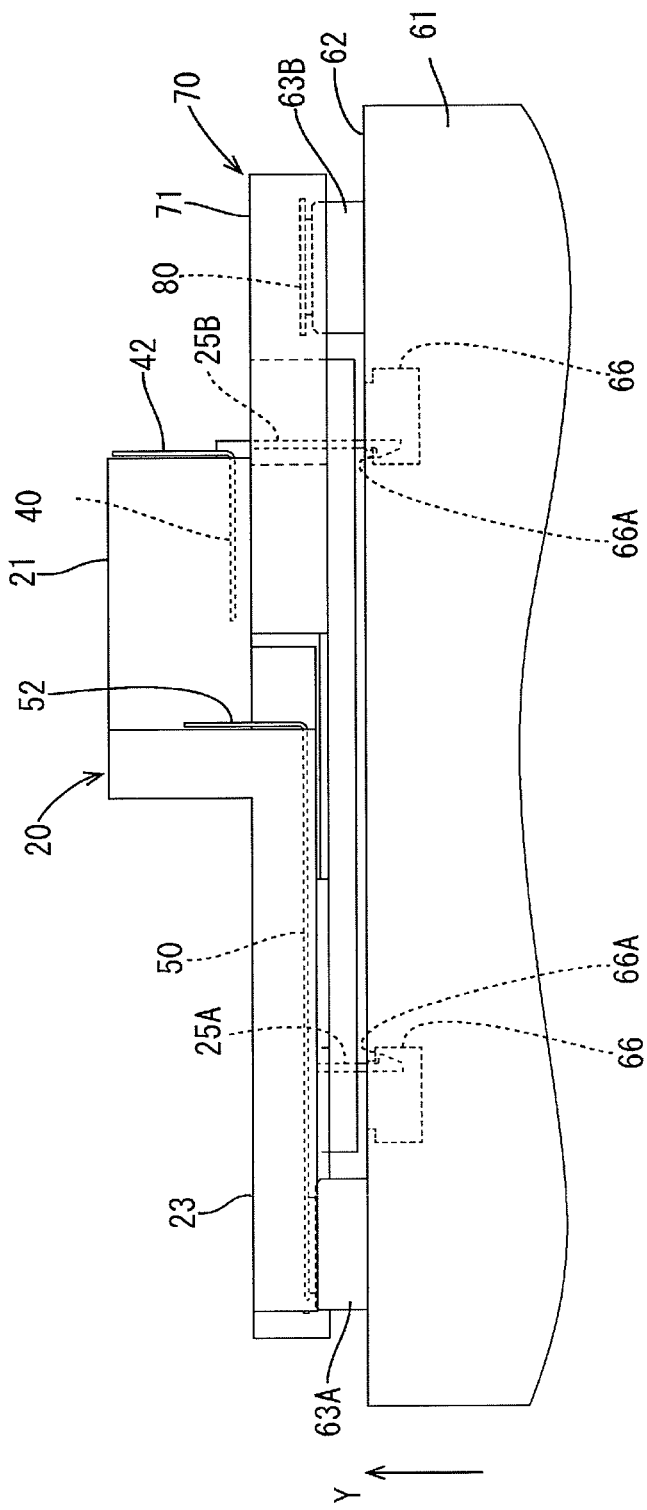
FIG. 5 is a side view of a power storage module.

As shown in FIGS. 4 and 5, the power storage module 100 of the present embodiment is largely constituted by the power storage element group 60 (see FIG. 6), which is constituted by aligning multiple (nine in the present embodiment) power storage elements 61, a battery connection module 70 (see FIG. 7), which is attached to the power storage element group 60, and the above-described external connection bus bar holding module 1. Hereinafter, the power storage element group 60 and the battery connection module 70 will be described simply.

2-1. Power Storage Element Group and Power Storage Element

Figure 6:
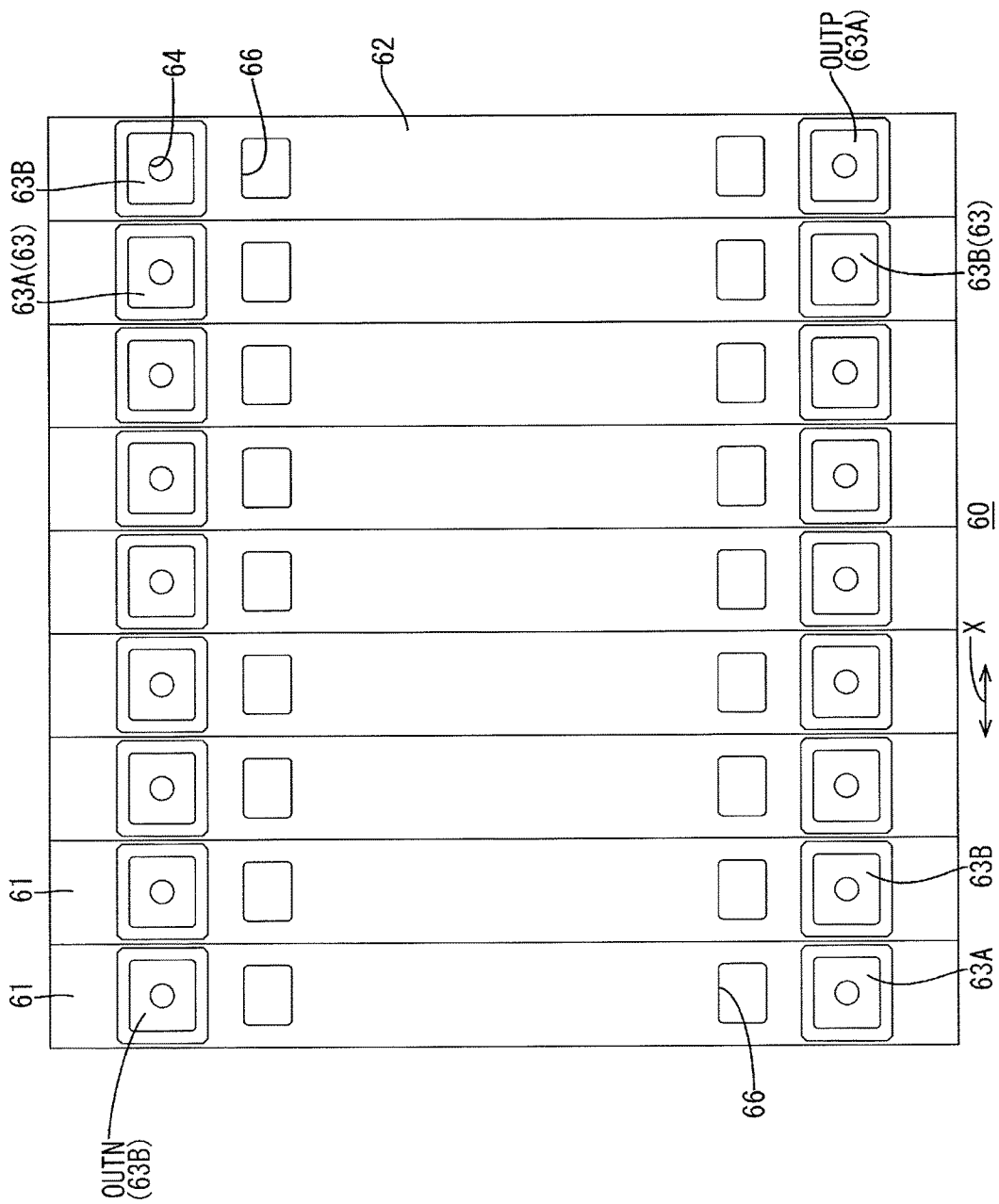
FIG. 6 is a plan view of a power storage element group.

The power storage elements 61 of the present embodiment are secondary batteries, for example. As shown in FIG. 6, the multiple power storage elements 61 are aligned in one row to form the power storage element group 60.

The power storage elements 61 have flat cuboid-shaped outer shapes, and as shown in FIG. 6, have electrode arrangement surfaces 62 that are perpendicular to the surfaces opposing the adjacent power storage elements 61. A pair of power storage elements 63 are arranged at positions near both end portions in the lengthwise direction on the electrode arrangement surface 62. One of the electrode terminals 63 is a cathode terminal 63A and the other is an anode terminal 63B. The electrode terminals 63 are made of metal and protrude in the form of rectangular tubes from the electrode arrangement surface 62 (see FIG. 5). Each electrode terminal 63 is provided with a screw hole 64 to which a bolt 82 (see FIG. 4) is coupled.

On the electrode arrangement surface 62 of each power storage element 61, the locking grooves 66 with which the locking piece 15 of the above-described first protector portion 10 and the locking pieces 25A and 25B of the second protector portion 20 engage are provided near the pair of electrode terminals 63. The locking grooves 66 have rectangular openings and have a form that is recessed in a recessed shape from the electrode arrangement surface 62 (see FIGS. 5 and 6). The locking grooves 66 include locking portions 66A that lock the locking pieces 15, 25A, and 25B. Due to the locking pieces 15, 25A, and 25B being locked by the locking portions 66A, the external connection bus bar holding module 1 is attached to the upper portion of the power storage element group 60.

The multiple power storage elements 61 are aligned such that electrode terminals 63 with different polarities are adjacent to each other on two adjacent power storage elements 61 (i.e., such that a cathode terminal 63A of one power storage element 61 and an anode terminal 63B of another power storage element 61 adjacent thereto are adjacent to each other). Also, as shown in FIG. 6, in the present embodiment, the anode terminal 63B of the power storage element 61 on the left end is the anode output terminal OUTN and the cathode terminal 63A of the power storage element 61 on the right end is the cathode output terminal OUTP.

2-2. Battery Connection Module

Figure 7:
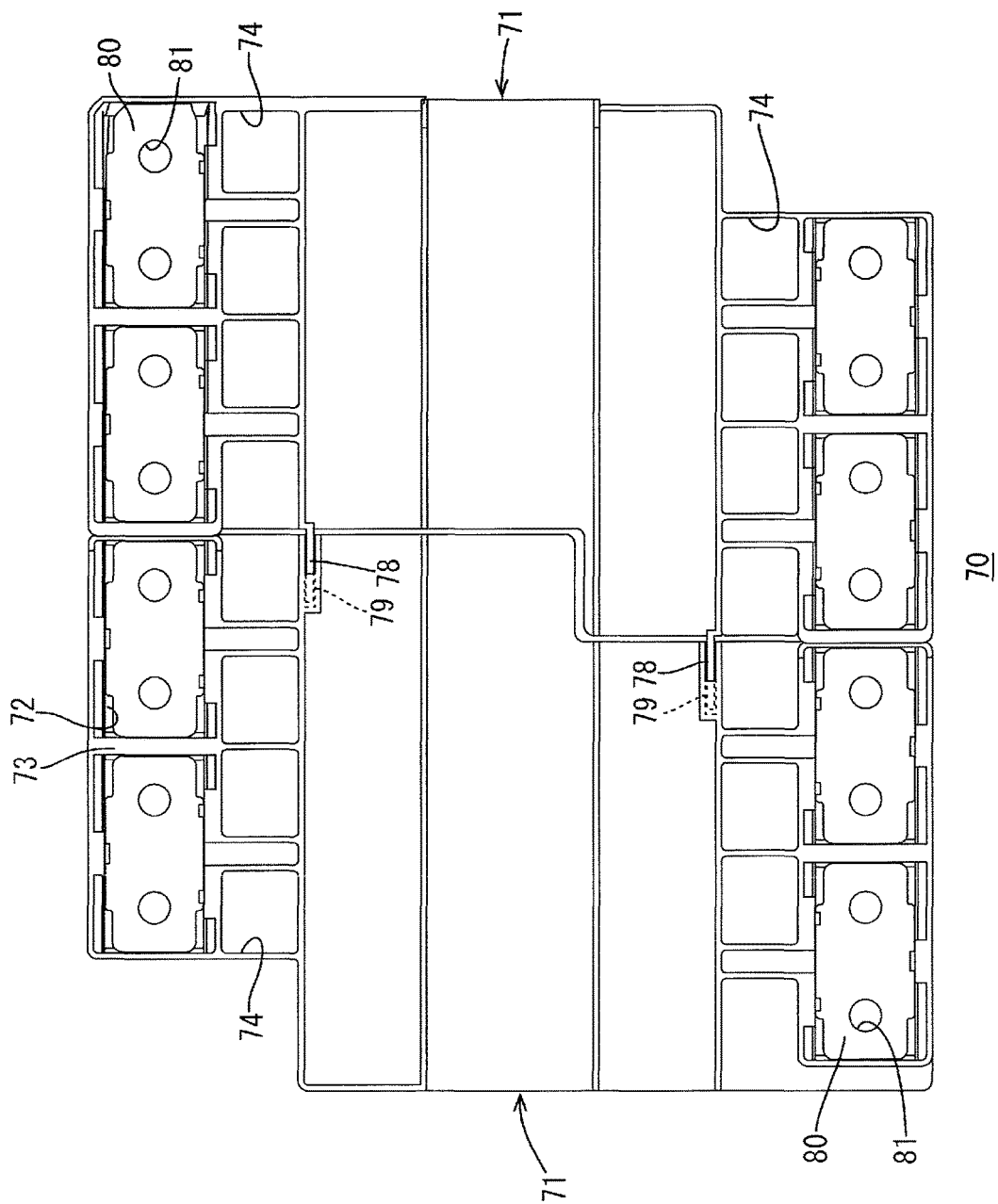
FIG. 7 is a plan view of a battery connection module.

The battery connection module 70 is a member that is attached to the surface constituted by the electrode arrangement surfaces 62 of the power storage elements 61 in the power storage element group 60. As shown in FIG. 7, the battery connection module 70 includes two insulating protectors 71, multiple bus bars 80 that are held in the insulating protectors 71 and connect the adjacent cathode terminals 63A and anode terminals 63B of the power storage elements 61, voltage detection terminals (not shown) that are arranged overlaid on the bus bars 80 and are electrically connected thereto, detection wires (not shown) that are connected to the voltage detection terminals, and the like. Also, the battery connection module 70 includes the above-described external connection bus bar holding module 1 above the insulating protector 71. Note that there is no limitation to this, and the battery connection module 70 need not include the external connection bus bar holding module 1. That is, the battery connection module 70 and the external connection bus bar holding module 1 may be constituted separately.

The bus bars 80 are formed by punching out metal plates, and as shown in FIG. 7, they are plate-shaped members with approximately rectangular shapes overall, the four corners of which are cut out into flat rectangular shapes. Each bus bar 80 is provided with two connection holes 81 for coupling bolts 82 (see FIG. 4) to the screw holes 64 of the power storage elements 61. Examples of the material of the bus bars 80 include copper, copper alloys, aluminum, aluminum alloys, and stainless steel (SUS).

In the present embodiment, two insulating protectors 71 are arranged side by side along the direction in which the multiple power storage elements 61 are arranged side by side. The insulating protectors 71 are constituted by an insulating member such as synthetic resin. As shown in FIG. 7, each insulating protector 71 includes a pair of bus bar holding portions 72 that are open in the vertical direction and contain and hold the bus bars 80, opening portions 74 for engaging the locking pieces 15, 25A, and 25B of the external connection bus bar holding module 1 with the locking grooves 66 of the power storage elements 61, and the like.

The bus bar holding portions 72 include rectangular tube-shaped containing walls 73 inside of which the bus bars 80 are held in a state of being insulated from adjacent bus bars 80, and the containing walls 73 also function as protection walls for the adjacent electrode terminals 63. Also, each insulating protector 71 is provided with engagement portions 78 and engagement receiving portions 79 for coupling with an adjacent insulating protector 71.

3. Method for Assembling Power Storage Module

When the power storage module 100 of the above-described present embodiment is assembled, first, two insulating protectors 71 are coupled to each other through the engagement portions 78 and the engagement receiving portions 79. Next, the bus bars 80 are contained in the bus bar holding portions 72 of the insulating protectors 71.

Figure 8:
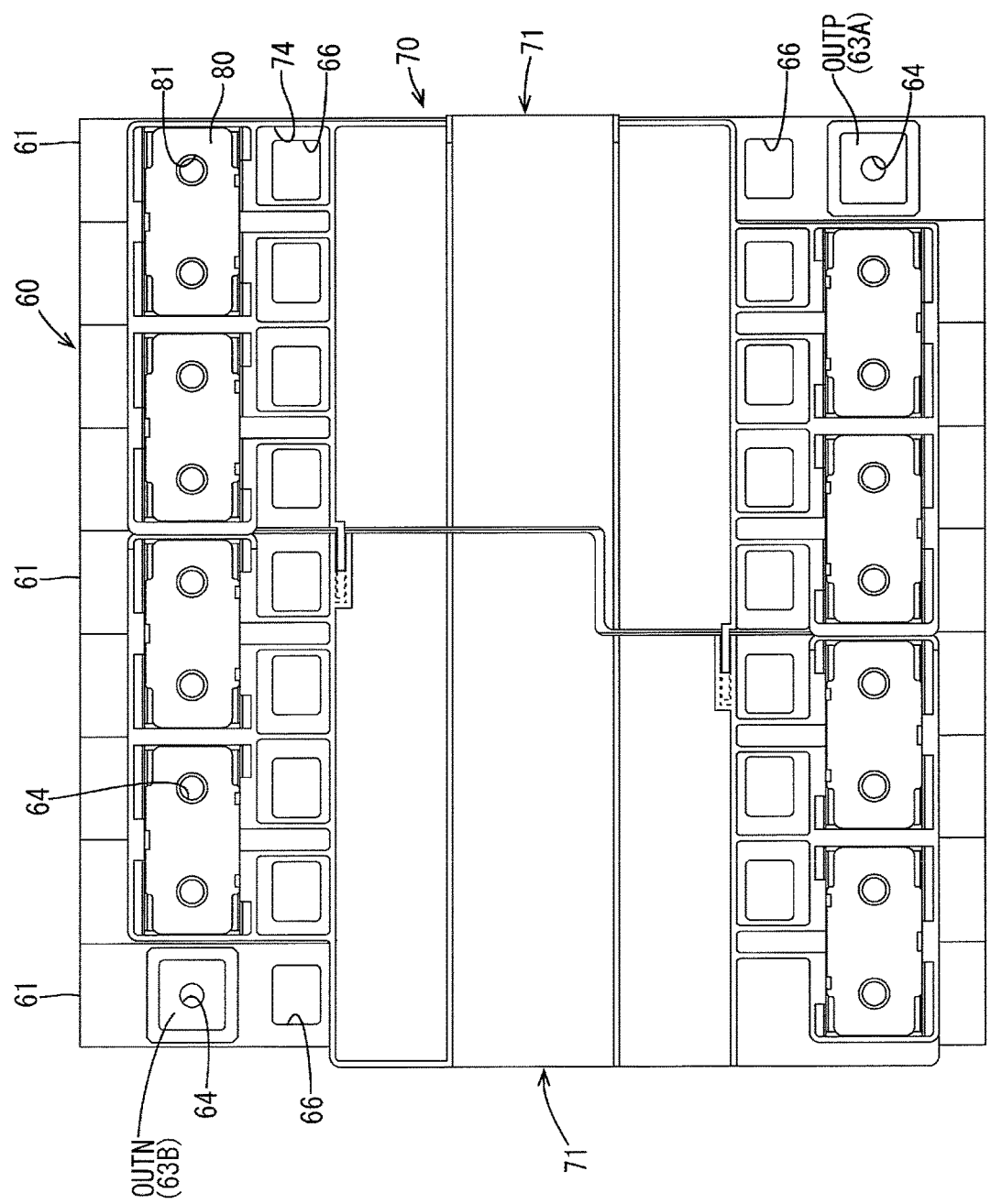
FIG. 8 is a plan view showing a state in which a battery connection module is placed on a power storage element group.

The thus-assembled battery connection module 70 is placed on the electrode arrangement surface 62 of the power storage element group 60. This state is shown in FIG. 8. Next, the bolt 82 is engaged with the screw hole 64 of the power storage element 61 via the connection hole 81 of the bus bar 80. Accordingly, the cathode terminals 63A and the anode terminals 63B of the adjacent power storage elements 61 are connected and the battery connection module 70 is attached to the power storage element group 60.

Next, the external connection bus bar holding module 1 to which the anode external connection bus bar 40 and the cathode external connection bus bar 50 are attached is attached to the power storage element group 60 from above the battery connection module 70. At this time, the locking pieces 15, 25A, and 25B of the external connection bus bar holding module 1 are engaged with the locking grooves 66 of the power storage elements 61 via the opening portions 74 of the battery connection module 70.

Note that the intermediate protector portion 30 is attached to the intermediate portion 40C of the anode external connection bus bar 40 before the anode external connection bus bar 40 is attached to the external connection bus bar holding module 1. That is, when the anode external connection bus bar 40 is attached to the external connection bus bar holding module 1, the first held portion 31 of the intermediate protector portion 30 is held in the first protector portion 10 and the second held portion 32 is held in the second protector portion 20. For this reason, the intermediate portion 40C of the anode external connection bus bar 40 does not come into direct contact with the first locking portion 12 of the first protector portion 10 or the second locking portion 22 of the second protector portion 20.

Also, a bolt 82 is engaged with the screw hole 64 of the anode output terminal OUTN of the power storage element group 60 via the through hole 41 of the anode external connection bus bar 40 and a bolt 82 is engaged with the screw hole 64 of the cathode output terminal OUTP of the power storage element group 60 via the through hole 51 of the cathode external connection bus bar 50. Accordingly, the external connection bus bar holding module 1, the anode external connection bus bar 40, and the cathode external connection bus bar 50 are attached to the power storage element group 60 from above the battery connection module 70. Thus, the power storage module 100 shown in FIG. 4 is completed.

4. Effect of Embodiment 1

In Embodiment 1, the external connection bus bar holding module 1 is constituted by three separate protector portions, namely the first protector portion 10, the second protector portion 20, and the intermediate protector portion 30. For this reason, for example, the length (shape) of the intermediate portion 40C of the first external connection bus bar 40 and the length (shape) of the intermediate protector portion 30 are adapted to the power extraction position of the power storage element group 60, whereby it is possible to adapt the external connection bus bar holding module 1 to any position of power extraction of the power storage element group 60. Also, when the length of the intermediate portion 40C of the first external connection bus bar 40 and the length of the intermediate protector portion 30 are adapted to the power extraction position of the power storage element group 60, the first protector portion 10 and the second protector portion 20 can be used as-is, and the length of the intermediate protector portion 30 can be adapted by merely changing the design.

Also, the first protector portion 10 and the second protector portion 20 are joined by the intermediate protector portion 30, whereby the external connection bus bar holding module 1 is integrated. For this reason, the task of attaching the external connection bus bar holding module 1 to the power storage element group 60 can be performed easily with one attachment step. That is, according to the external connection bus bar holding module 1 of the present embodiment, it is possible to adapt to any position of power extraction of the power storage element group 60 and attachment to the power storage element group 60 can be performed easily.

Also, in the present embodiment, if the anode output terminal (first output electrode terminal) OUTN and the cathode output terminal (second output electrode terminal) OUTP of the power storage element group 60 are arranged separated on both end portions in the alignment direction (direction of arrow X in FIG. 6) of the multiple power storage elements 61 in the power storage element group 60, the position of the first external connection portion 40B of the anode external connection bus bar (first external connection bus bar) 40 and the position of the second external connection portion 50B of the cathode external connection bus bar (second external connection bus bar) 50 are set on the right end side (the same end side) in the alignment direction of the multiple power storage elements 61 in the power storage element group 60, as shown in FIG. 4. That is, if the anode output terminal OUTN and the cathode output terminal OUTP are arranged separated on both end portions of the power storage element group 60, it is possible to easily and accurately realize a state in which the positions (power extraction positions of the power storage element group) of the first external connection portion 40B (first connection terminal portion 42) and the second external connection portion 50B (second connection terminal portion 52) are at one end side in the alignment direction of the multiple power storage elements 61 in the power storage element group 60.

Figure 9:
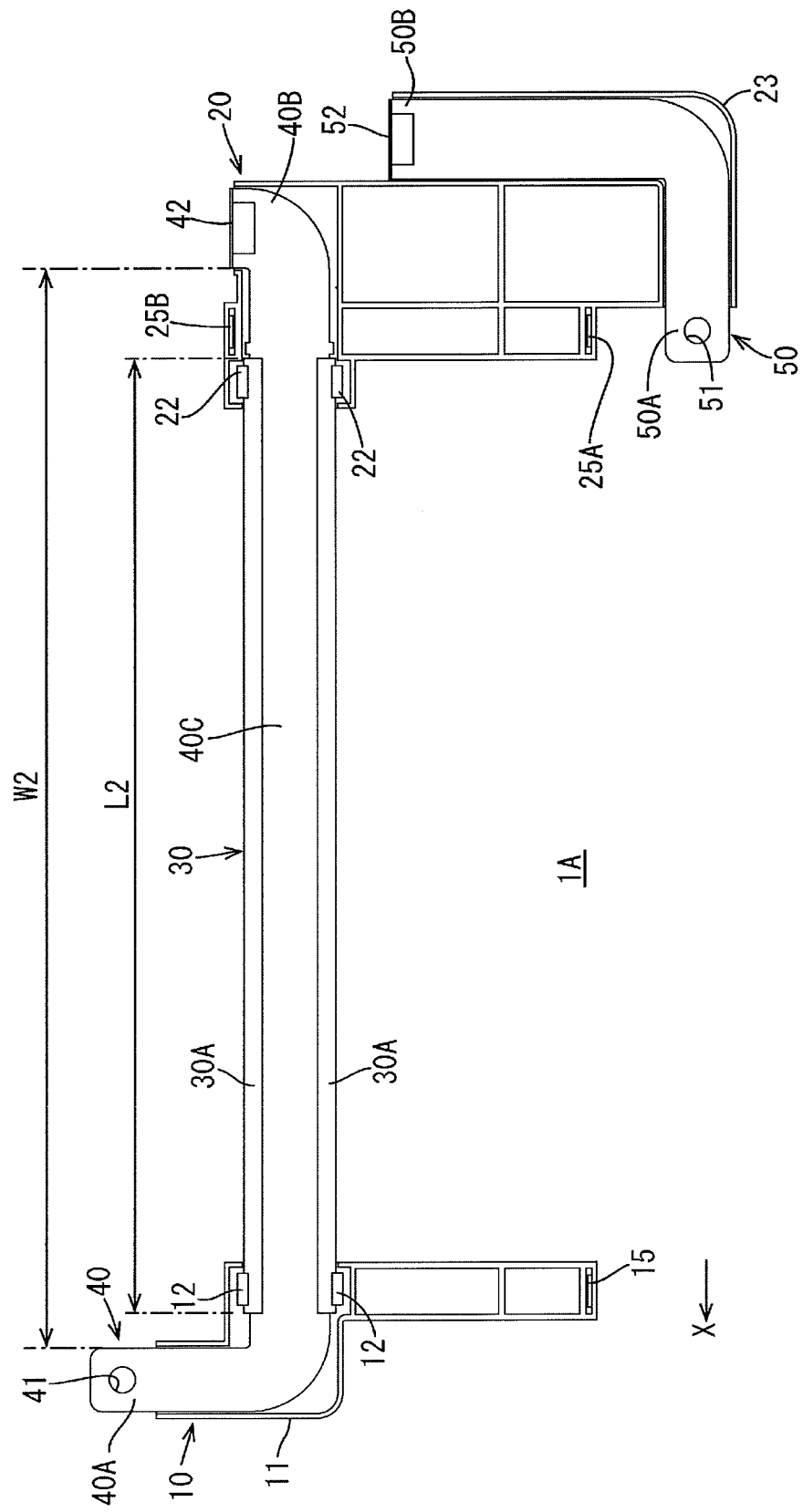
FIG. 9 is a plan view showing another mode of an external connection bus bar holding module.
Figure 10:
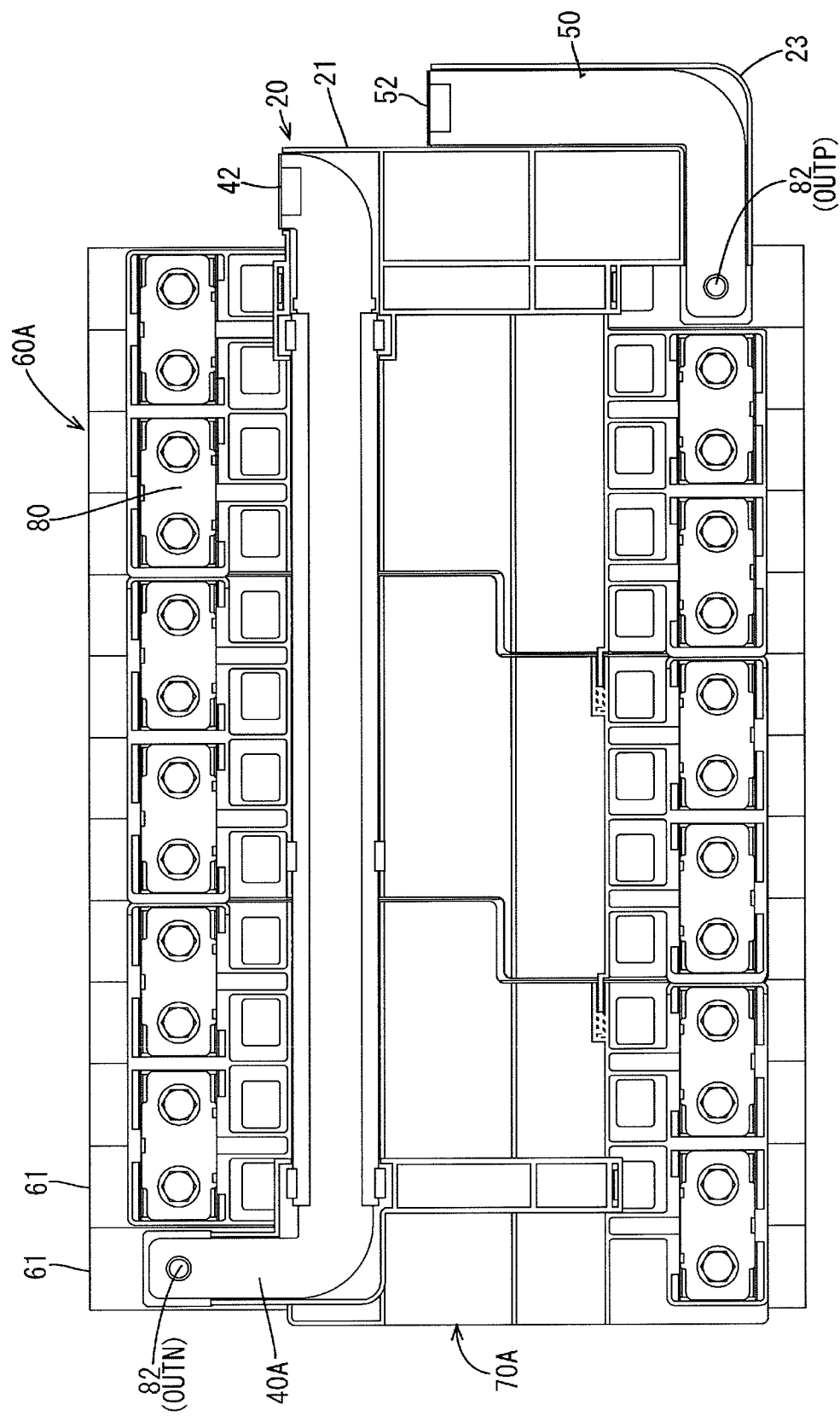
FIG. 10 is a plan view showing another mode of a power storage module.

Also, since the intermediate protector portion 30 is formed through extrusion molding, when the intermediate protector portion 30 is formed, only one mold is needed, regardless of the length L of the intermediate protector portion 30. Also, the length L of the intermediate protector portion 30 can be changed easily according to the number of power storage elements of the power storage element group 60. For example, the length L of the intermediate protector portion 30 is changed to L2 as shown in FIG. 9, and thus the intermediate protector portion 30 can be easily applied to a power storage element group 60A with 13 power storage elements as shown in FIG. 10.

That is, among the three protectors, namely the first protector portion 10, the second protector portion 20, and the intermediate protector portion 30, the length of only the intermediate protector portion 30 is changed during extrusion molding, whereby it is possible to easily adapt to multiple types of power storage element groups 60 with different numbers of power storage elements. For this reason, when adapting to multiple types of power storage element groups 60, there is no need to separately create another mold, and expenses when adapting the external connection bus bar holding module 1 to the multiple types of power storage element groups 60 can be reduced.

Also, with the battery connection module 70 including the external connection bus bar holding module 1, it is possible to adapt to any position of power extraction of the power storage element group 60 and the external connection bus bar holding module 1 can easily be attached to the power storage element group 60.

Embodiment 2

Next, Embodiment 2 will be described with reference to FIGS. 11 to 14. The battery connection module 70A of Embodiment 2 differs from that of Embodiment 1 in that it includes a cover 90. For this reason, only the points of difference therefrom will be described hereinafter, configurations that are the same as in Embodiment 1 are denoted by the same member reference signs thereas, and description thereof is not included.

Figure 11:
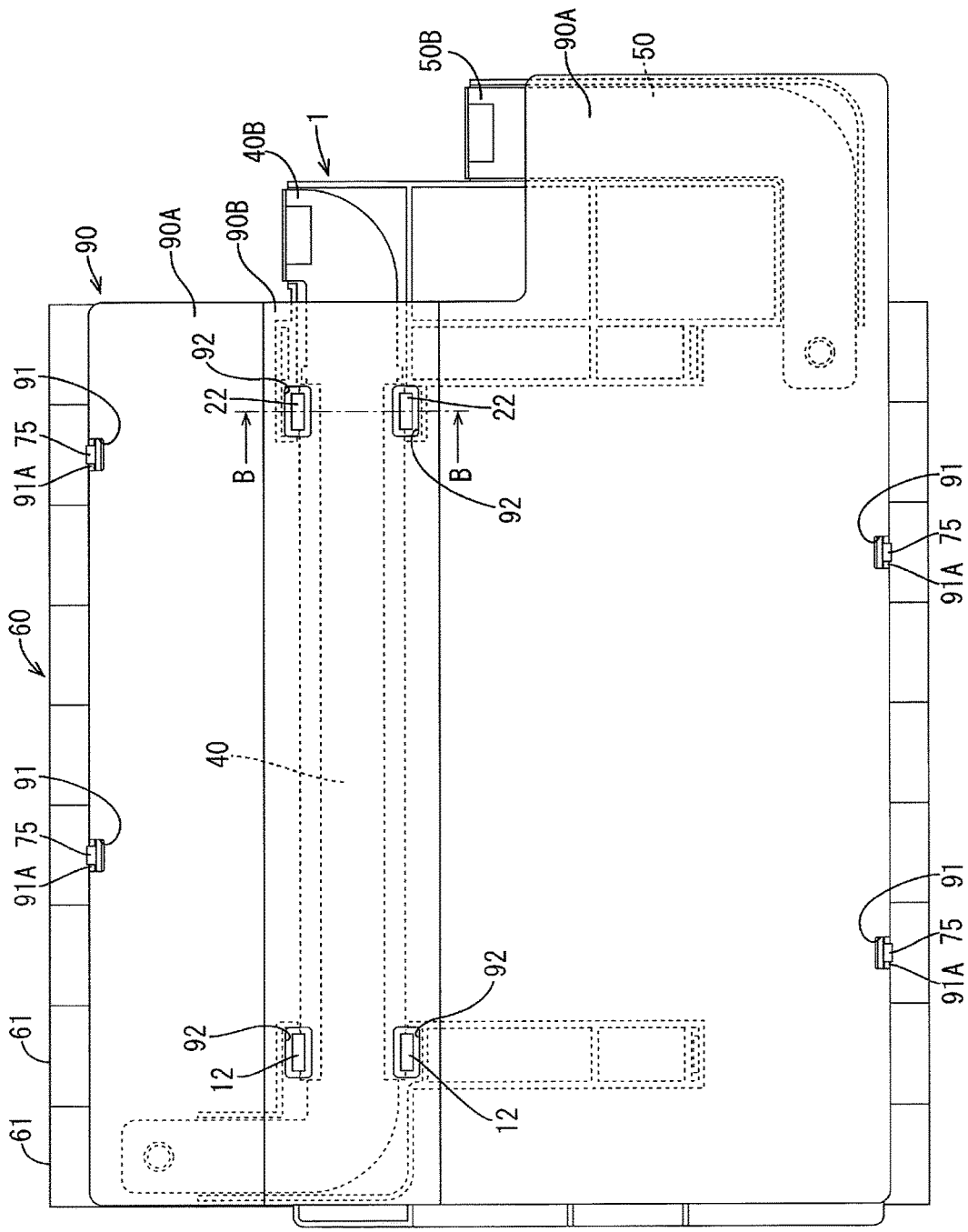
FIG. 11 is a plan view of a power storage module according to Embodiment 2.

That is, as shown in FIG. 11, the battery connection module 70A of Embodiment 2 includes, on its upper portion, the cover 90 that covers the anode external connection bus bar 40, the cathode external connection bus bar 50, and the power storage element group 60.

Specifically, the first external connection portion 40B of the anode external connection bus bar 40 and the second external connection portion 50B of the cathode external connection bus bar 50 are exposed from the cover 90 in order to connect to an external device. Also, as shown in FIG. 11, part of the power storage element group 60 is exposed from the cover 90. That is, the planar shape of the cover 90 is not limited to that shown in FIG. 13, and in short, it need only be a shape that covers, from above, at least the anode external connection bus bar 40 excluding the first external connection portion 40B, the cathode external connection bus bar 50 excluding the second external connection portion 50B, and the bus bars 80.

Figure 12:
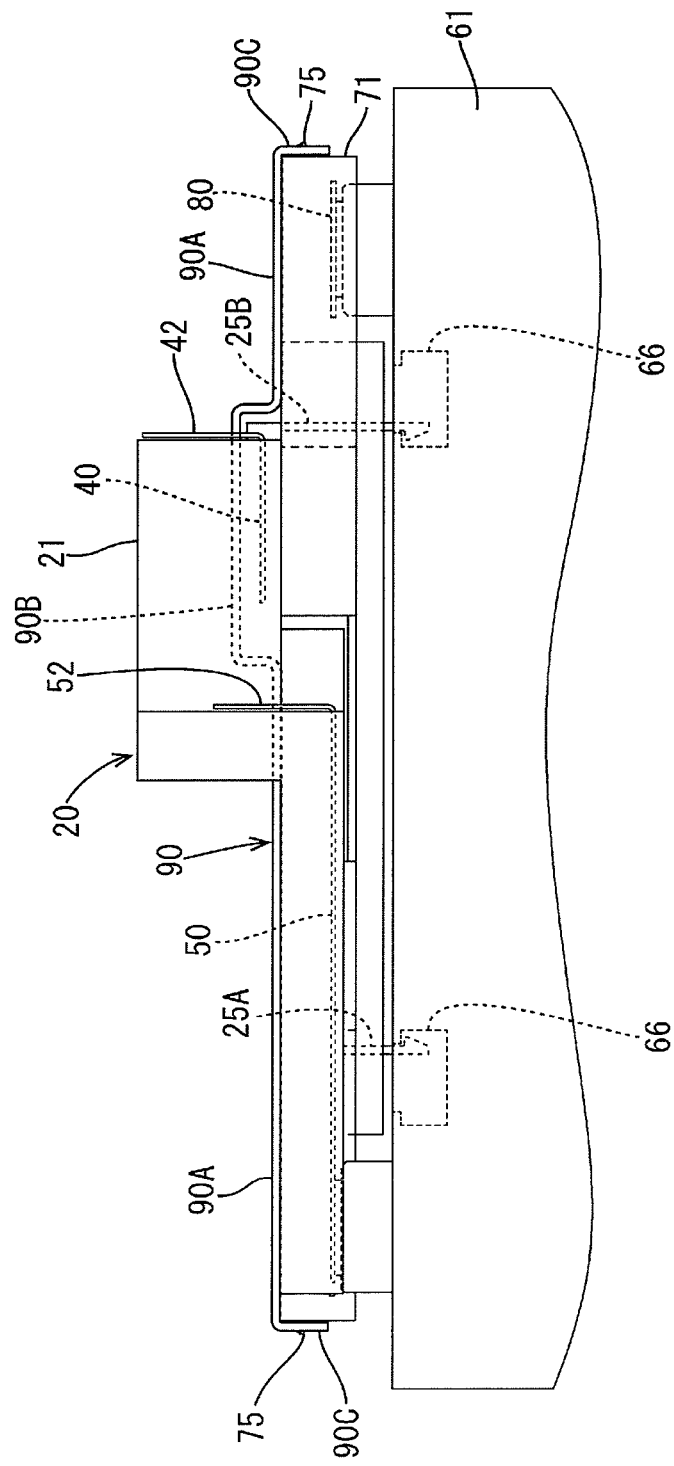
FIG. 12 is a side view of a power storage module according to Embodiment 2.
Figure 13:
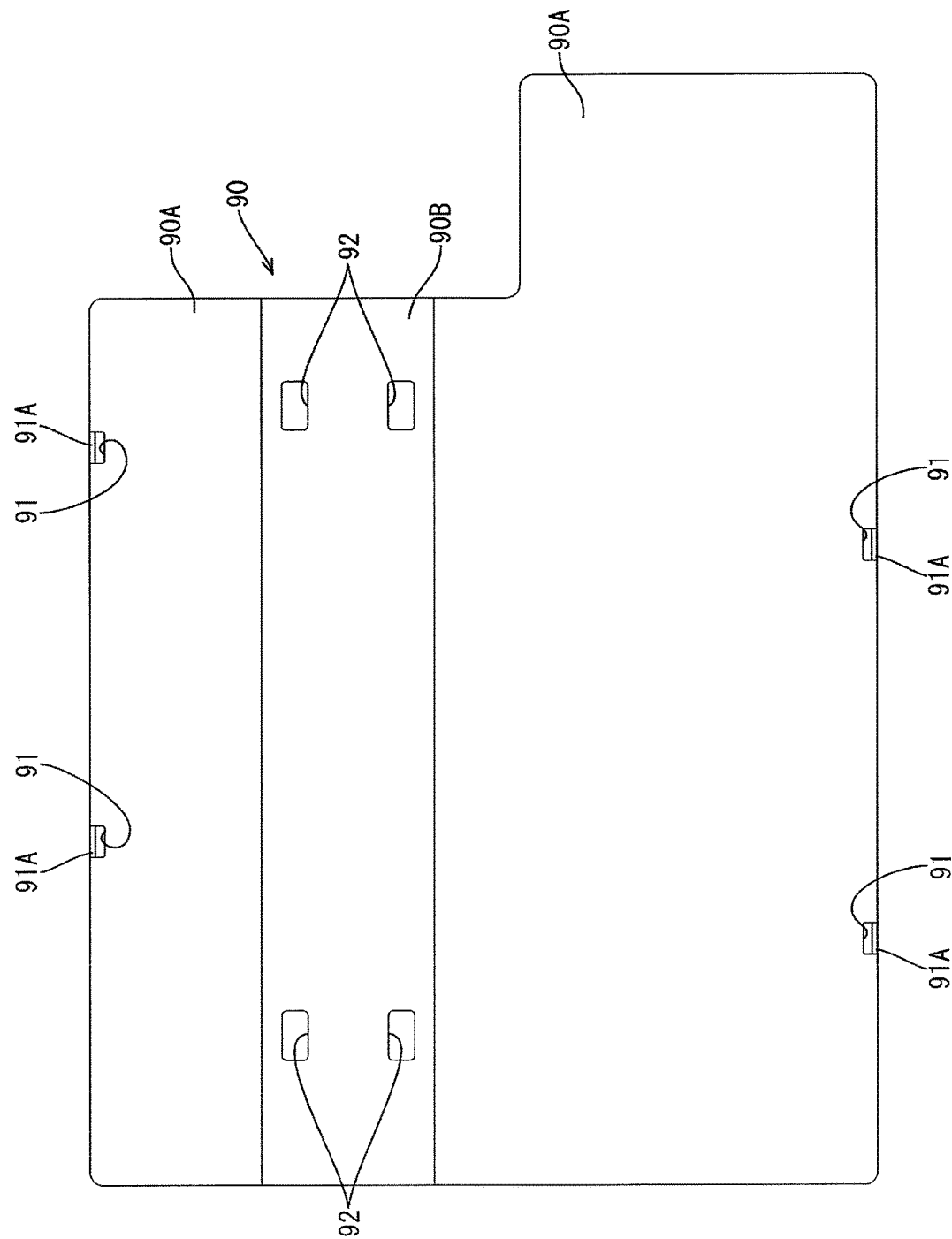
FIG. 13 is a plan view of a cover.
Figure 14:
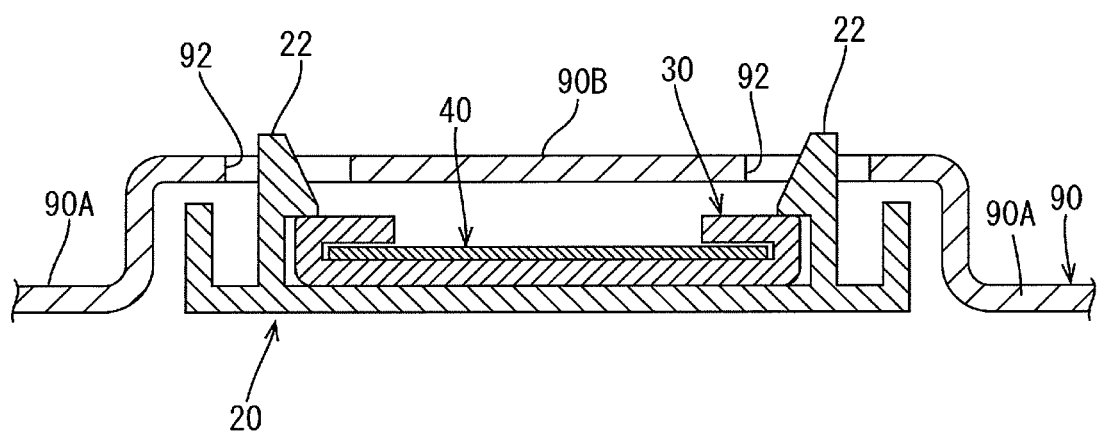
FIG. 14 is a cross-sectional view taken along line B-B in FIG. 11.

As shown in FIGS. 12 and 13, the cover 90 includes a flat portion 90A, a protruding portion 90B, and a wall portion 90C. As shown in FIG. 14, the protruding portion 90B protrudes to a predetermined height from the flat portion 90A in order to cover the intermediate protector portion 30 of the external connection bus bar holding module 1.

As shown in FIGS. 11 and 12, the boundary portion (bent portion) from the flat portion 90A to the wall portion 90C of the cover 90 is provided with four locking holes 91 for attaching the cover 90 to the insulation protector 71. When the cover 90 is attached to the insulating protector 71, locking claws 75 formed on the insulating protector 71 are inserted into four locking holes 91, and end portions 91A of the locking holes 91 are locked onto the locking claws 75, and thereby the cover 90 is fixed to the insulating protector 71. Note that the locking claws 75 and the locking holes 91 may be provided in any number and any shape.

Also, as shown in FIGS. 11 and 12, the protruding portion 90B of the cover 90 is provided with four through holes 92 that penetrate through the first locking portion 12 of the first protector portion 10 and the second locking portion 22 of the second protector portion 20. Note that the through holes 92 may have any planar shape. Also, if the heights of the first locking portion 12 and the second locking portion 22 of the through holes 92 are low, the through holes 92 may be omitted, or the protruding portions 90B of the corresponding portions may be made thinner such that the first locking portion 12 and the second locking portion 22 do not come into contact therewith.

Note that the configuration in which the length L of the intermediate protector portion 30 is changed to L2 as shown in FIG. 9 in Embodiment 1 can also be applied to Embodiment 2.

5. Effect of Embodiment 2

In Embodiment 2, the battery connection module 70A includes the cover 90 that covers, from above, the anode external connection bus bar (first external connection bus bar) 40 excluding the first external connection portion 40B, the cathode external connection bus bar (second external connection bus bar) 50 excluding the second external connection portion 50B, and the bus bars 80. For this reason, it is possible to prevent two adjacent bus bars 80, or the anode external connection bus bar 40 and the cathode external connection bus bar 50 from being short-circuited by an external metal, or the like. Also, it is possible to suppress a case in which dust or the like enters the battery connection module 70A.

Other Embodiments

The technique disclosed in the present specification is not limited to the embodiment described by means of the description above and the drawings, and for example, the following embodiments are also encompassed in the technical scope.

(1) In the above-described embodiments, an example was shown in which the position of the first external connection portion 40B of the first external connection bus bar 40 and the position of the second external connection portion 50B of the second external connection bus bar 50 are set on the right end side (the same end side) in the alignment direction of the multiple power storage elements 61 in the power storage element group 60, but there is no limitation to this. For example, the position of the first external connection portion 40B of the anode external connection bus bar 40 may be an intermediate position in the same alignment direction, on the one end side (one end side in the direction of arrow Y in FIG. 4) in the direction orthogonal to the alignment direction of the power storage element group 60. At this time, the planar shapes of the intermediate protector portion 30 and the second protector portion 20 and the planar shape of the anode external connection bus bar 40 are also changed as appropriate according to the position of the first external connection portion 40B. Also, even if the positions of the first external connection portion 40B and the second external connection portion 50B are on the right end side in the alignment direction of the multiple power storage elements 61, the positions are not limited to the positions shown in FIG. 4, and the positions may be adjacent to the upper end portions of the power storage elements 61 on the right end, for example.

Also, in FIG. 4, an example is shown in which the first electrode connection portion 40A of the first external connection bus bar 40 is connected to the anode terminal 63B (OUTN: 82) of the power storage element 61 on the left end and the second electrode connection portion 50A of the second external connection bus bar 50 is connected to the cathode terminal 63A (OUTN: 82) of the power storage element 61 on the right end, but there is no limitation to this. That is, there is no limitation to the first electrode connection portion 40A and the second electrode connection portion 50A being connected to the electrode terminals 63 (82) of the power storage elements 61 on both ends of the power storage element group 60. For example, the first electrode connection portion 40A of the first external connection bus bar 40 may be connected to the anode terminal 63B (OUTN) of the third power storage element 61 from the left end.

(2) In the above-described embodiments, an example was shown in which the intermediate protector portion 30 is constituted by synthetic resin that elastically deforms and is formed through extrusion molding, but there is not necessarily a limitation thereto. For example, the intermediate protector portion 30 may be constituted by synthetic resin that does not elastically deform, and the intermediate protector portion 30 need not be formed through extrusion molding. Also, the planar shape of the intermediate protector portion 30 is not limited to that shown in FIG. 1 and the like, that is, the linear shape that extends in the alignment direction (direction of arrow X in FIG. 1) of the power storage elements 61. The planar shape of the intermediate protector portion 30 may be changed as appropriate in correspondence to the planar shape of the intermediate portion 40C of the anode external connection bus bar 40. For example, if the intermediate portion 40C of the anode external connection bus bar 40 has a planar shape with a bend in it, the planar shape of the intermediate protector portion 30 may also accordingly have a planar shape with a bend in it.

(3) In the above-described embodiments, the second protector portion 20 includes the second bus bar holding portion 23 that holds the cathode external connection bus bar 50, but there is no limitation to this, and the second protector portion 20 need not include the second bus bar holding portion 23. That is, the second protector portion 20 need not hold the cathode external connection bus bar 50.

(4) In the above-described embodiments, the planar shapes of the first protector portion 10 and the second protector portion 20 are not limited to those shown in FIG. 1. For example, a configuration was used in which the first protector portion 10 includes the first locking portion 12 and the second protector portion 20 includes the second locking portion 22, but the first locking portion 12 and the second locking portion 22 may be omitted.

(5) In the above-described embodiments, a configuration was shown in which the external connection bus bar holding module 1 is constituted by three protector portions, namely a first protector portion 10, a second protector portion 20, and an intermediate protector portion 30 and the external connection bus bar holding module 1 is integrated by the first protector portion 10 and the second protector portion 20 being joined by the intermediate protector portion 30, but the configuration of the external connection bus bar holding module is not limited to this configuration.

In short, it is sufficient to use a configuration in which the external connection bus bar holding module includes: a first protector portion that holds the first electrode connection portion of the first external connection bus bar; a second protector portion that is arranged at an interval from the first protector portion and holds the first external connection portion of the first external connection bus bar; and an intermediate protector portion that is located between the first protector portion and the second protector portion and holds the intermediate portion of the first external connection bus bar between the first protector portion and the second protector portion.

Figure 15:
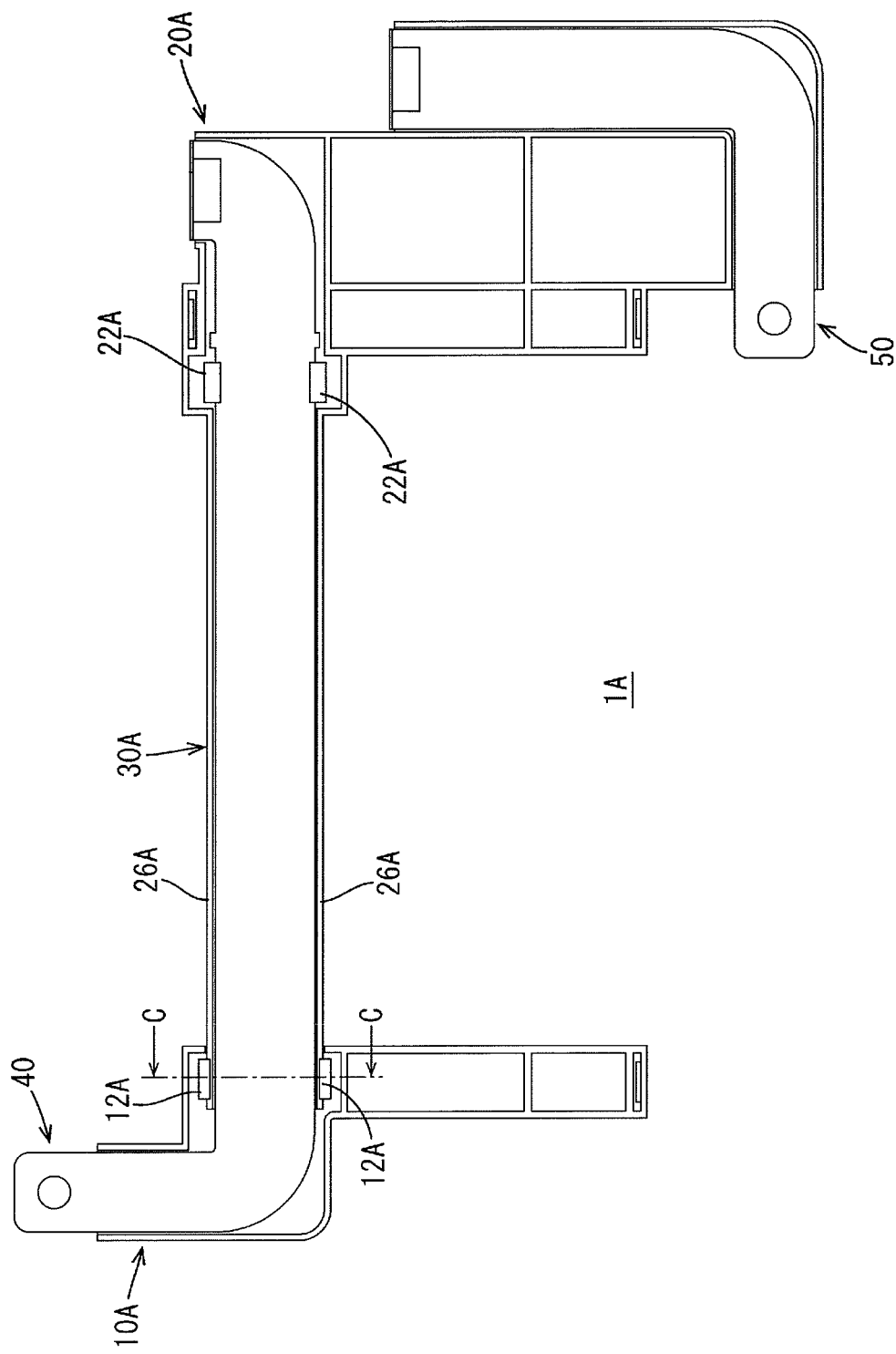
FIG. 15 is a plan view of another external connection bus bar holding module.
Figure 16:
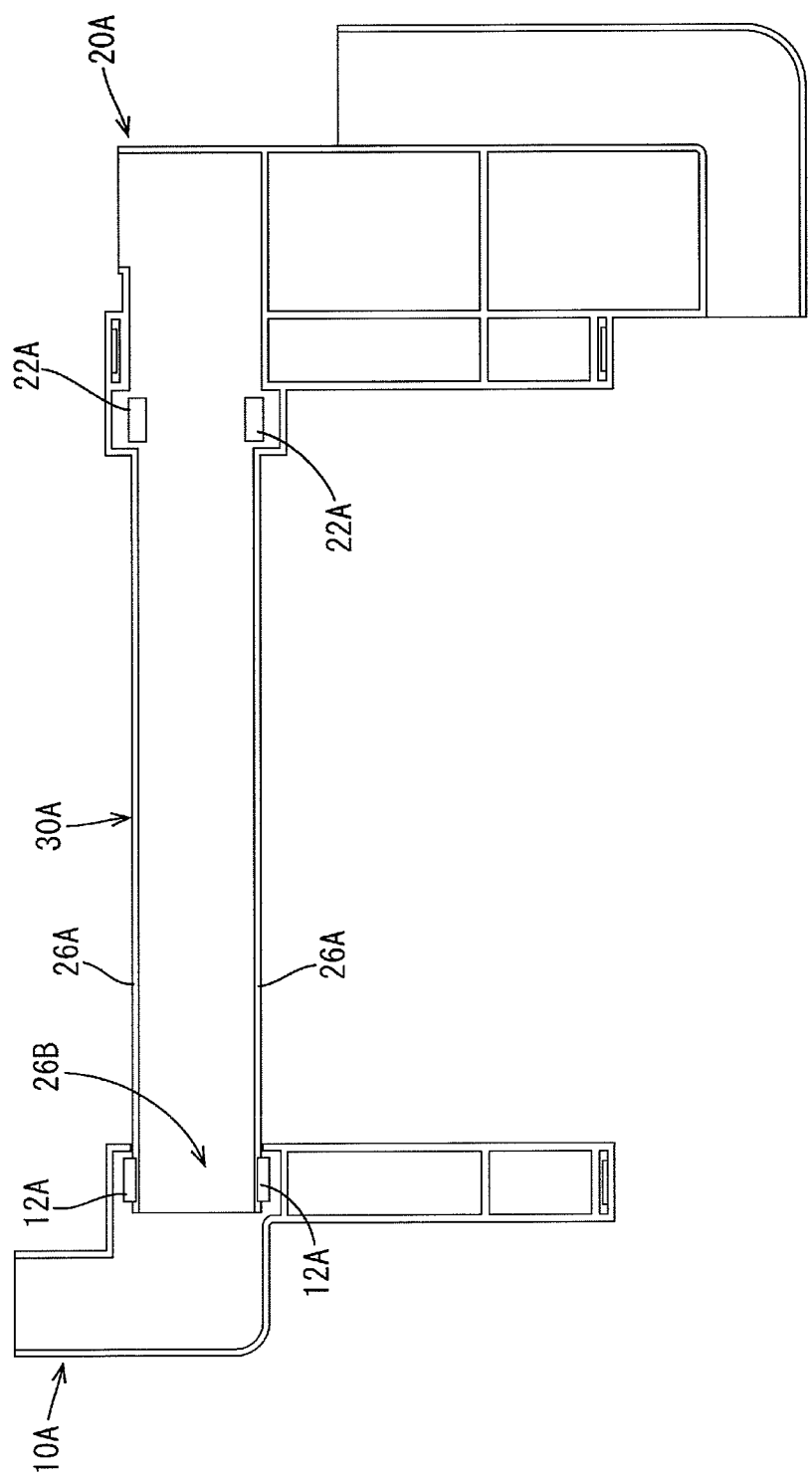
FIG. 16 is a plan view obtained by removing the external connection bus bars from FIG. 15.
Figure 17:
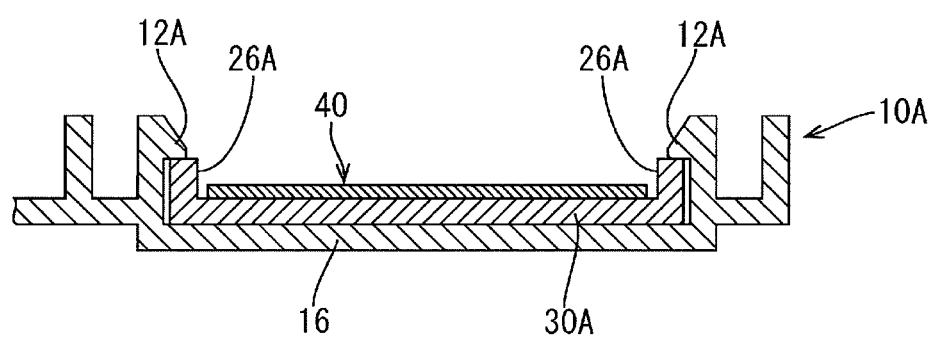
FIG. 17 is a cross-sectional view taken along line C-C in FIG. 15.

For example, as shown in the external connection bus bar holding module 1A in FIGS. 15 to 17, it is also possible to use a configuration in which the intermediate protector portion 30A is formed integrally with the second protector portion 20A and the one end portion 26B of the intermediate protector portion 30A is held by the non-integrated first protector portion 10A. At this time, for example, as shown in FIG. 17, a holding recess 16 that holds the one end portion 26 may be formed at a position corresponding to the one end portion 26B of the intermediate protector portion in the first protector portion 10A. Also, as shown in FIGS. 17 and 18, the first protector portion 10A may be provided with a pair of locking portions 12A that engage with the upper portion of the side wall 26A of the intermediate protector portion 30A and lock the one end portion 26B, and the second protector portion 20A may be provided with a pair of locking portions 22A that lock the first external connection bus bar 40.

Note that conversely to this configuration, it is also possible to use a configuration in which the intermediate protector portion 30A is formed integrally with the first protector portion 10A and the one end portion of the intermediate protector portion 30A is held by the non-integrated second protector portion 20A.

In these cases, the intermediate protector portion 30A is integrated with the first protector portion 10A and the second protector portion 20A. For this reason, the configuration for holding the first external connection bus bar 40 can be simplified, that is, the configuration for holding the intermediate protector portion 30A can be omitted in the first protector portion 10A or the second protector portion 20A. Accompanying this, the configuration serving as the external connection bus bar holding module 1A can be simplified.

Figure 18:
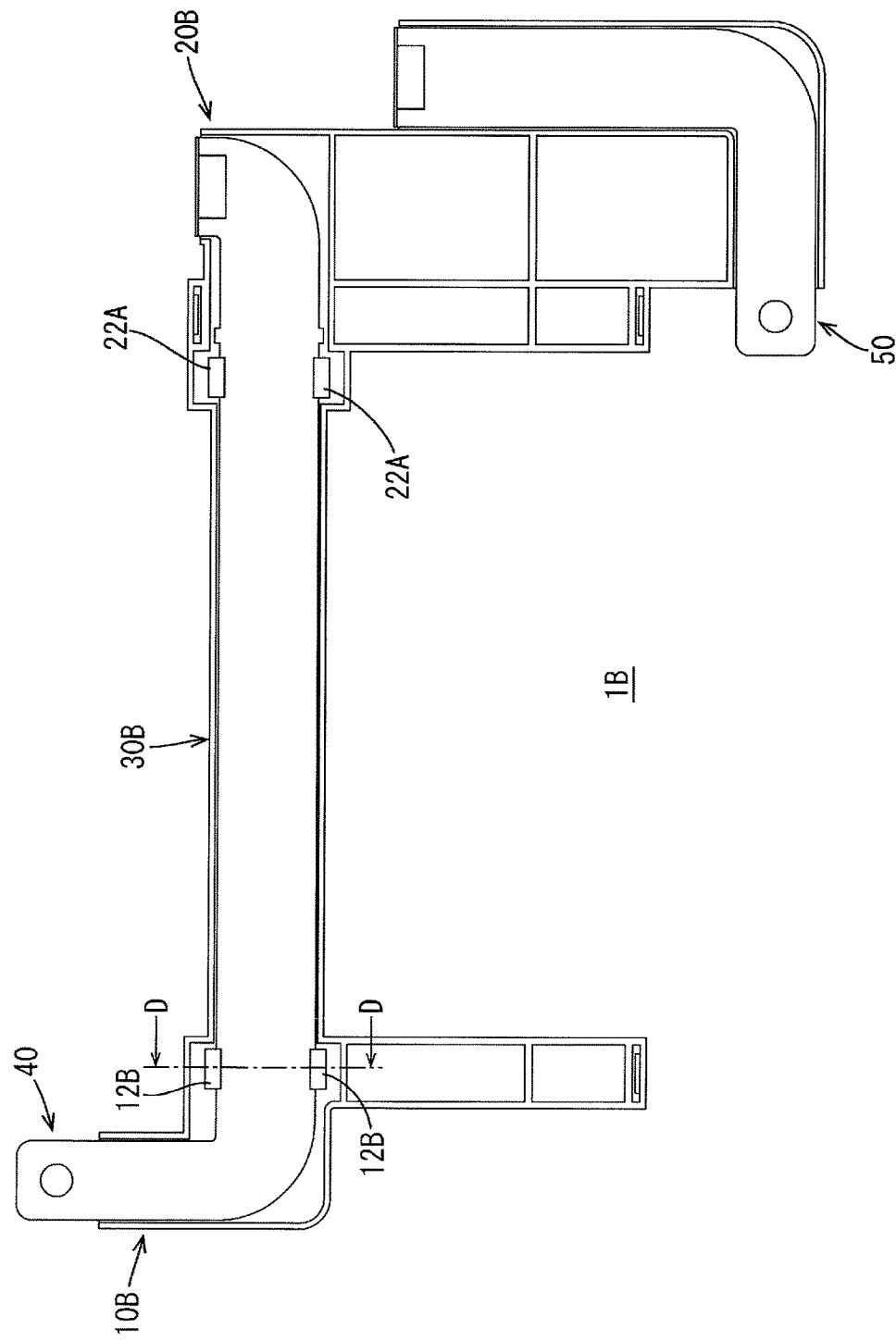
FIG. 18 is a plan view of another external connection bus bar holding module.
Figure 19:
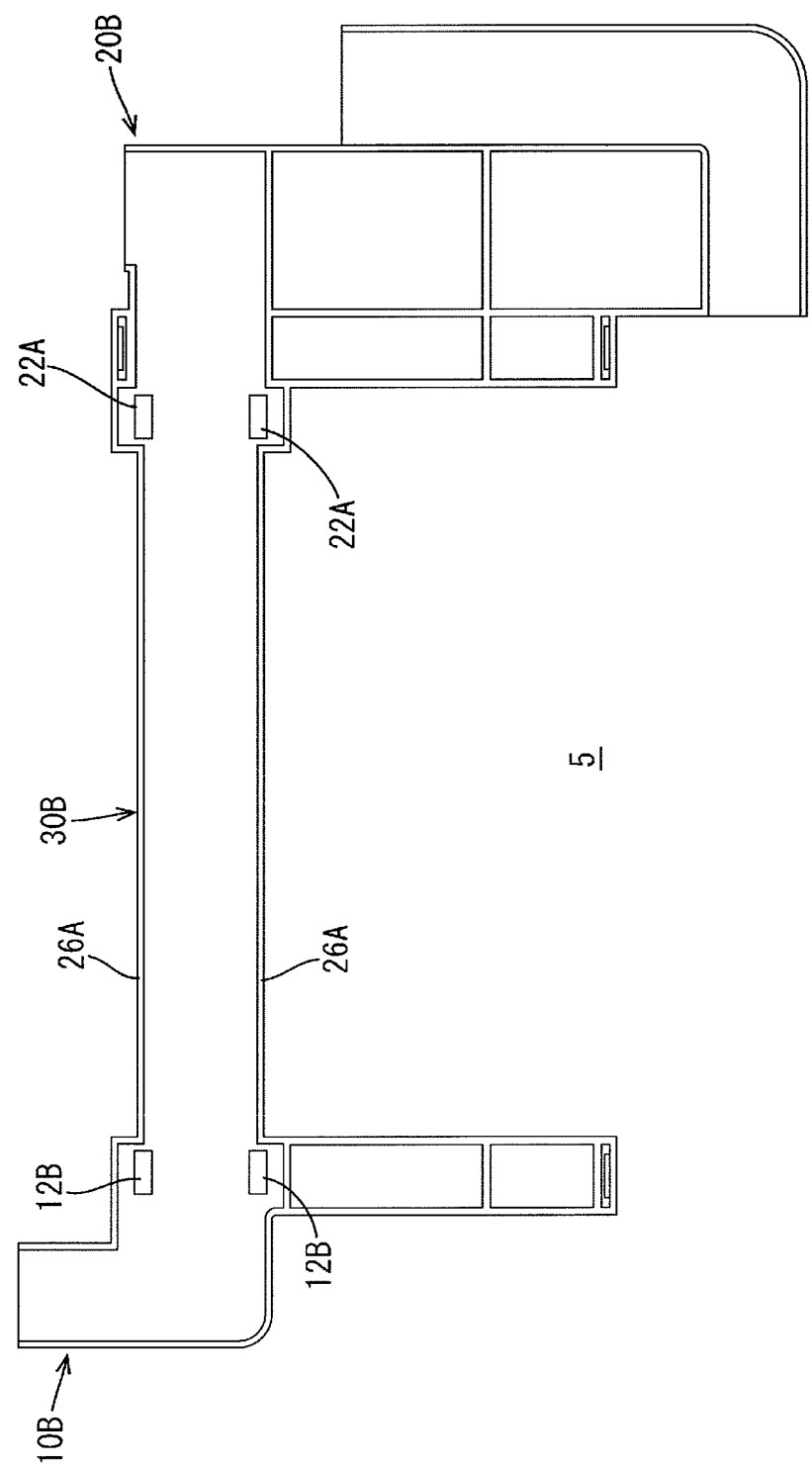
FIG. 19 is a plan view obtained by removing the external connection bus bars from FIG. 18.
Figure 20:
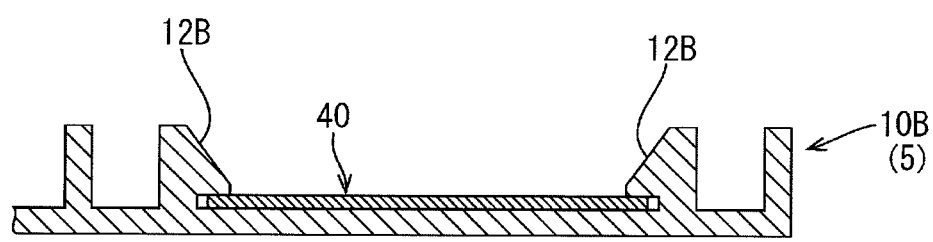
FIG. 20 is a cross-sectional view taken along line D-D in FIG. 18.

Also, as shown in the external connection bus bar holding module 1B in FIGS. 18 to 20, it is also possible to use a configuration in which the intermediate protector portion 30B is formed integrally with the first protector portion 10B and the second protector portion 20B. That is, the first protector portion 10, the second protector portion 20, and the intermediate protector portion 30 with the planar shapes shown in FIG. 1 may be constituted by one integral protector 5 made of synthetic resin. At this time, for example, as shown in FIGS. 19 and 20, the first protector portion 10B may be provided with a pair of locking portions 12B that lock the first external connection bus bar 40.

In this case, the intermediate protector portion 30B is integrated with the first protector portion 10B and the second protector portion 20B. For this reason, the configuration for holding the first external connection bus bar 40 can be further simplified, that is, the configuration for holding the intermediate protector portion 30B can be omitted. Accompanying this, the configuration serving as the external connection bus bar holding module 1B can be further simplified.

Also, even if part of the intermediate protector portion 30A is integrated with another protector portion or all of the intermediate protector portion 30B is integrated with another protector portion, it is possible to adapt to any position of power extraction of the power storage element group 60 by changing the length (shape) of the portion corresponding to the intermediate protector portion and it is possible to easily attach the external connection bus bar holding module to the power storage element group 60.

LIST OF REFERENCE NUMERALS 1, 1A, 1B External connection bus bar holding module
10, 10A, 10B First protector portion
20, 20A, 20B Second protector portion
30, 30A, 30B Intermediate protector portion
31 First held portion (one end portion)
32 Second held portion (other end portion)
40 Anode external connection bus bar (first external connection bus bar)
40A First electrode connection portion
40B First external connection portion
50 Cathode external connection bus bar (second external connection bus bar)
50A Second electrode connection portion
50B Second external connection portion
60 Power storage element group
61 Power storage element
70, 70A Battery connection module
71 Insulating protector
80 Bus bar
90 Cover
OUTN Anode output terminal (first output electrode terminal)
OUTP Cathode output terminal (second output electrode terminal)

What is claimed is:

1. An external connection bus bar holding module configured to be attached to a power storage element group that includes a plurality of power storage elements including positive and negative electrode terminals, wherein the power storage element group includes a first output electrode terminal configured to output power of one polarity and a second output electrode terminal configured to output power of another polarity, the external connection bus bar holding module comprising:
    a first external connection bus bar that includes a first electrode connection configured to be connected to the first output electrode terminal, a first external connection configured to be connected to an external device, and an intermediate structure located between the first electrode connection and the first external connection;
    a second external connection bus bar that includes a second electrode connection configured to be connected to the second output electrode terminal and a second external connection configured to be connected to the external device;
    a first protector that holds the first electrode connection of the first external connection bus bar;
    a second protector that is arranged at an interval from the first protector and holds the first external connection of the first external connection bus bar; and
    an intermediate protector that is located between the first protector and the second protector and holds the intermediate structure of the first external connection bus bar between the first protector and the second protector, wherein
    the intermediate protector is formed integrally with one of the first protector or the second protector, and
    one end of the intermediate protector is held by the other of the first protector or second protector with which it is not formed integrally.

2. An external connection bus bar holding module configured to be attached to a power storage element group that includes a plurality of power storage elements including positive and negative electrode terminals, wherein the power storage element group includes a first output electrode terminal configured to output power of one polarity and a second output electrode terminal configured to output power of another polarity, the external connection bus bar holding module comprising:
    a first external connection bus bar that includes a first electrode connection configured to be connected to the first output electrode terminal, a first external connection configured to be connected to an external device, and an intermediate structure located between the first electrode connection and the first external connection;

a second external connection bus bar that includes a second electrode connection configured to be connected to the second output electrode terminal and a second external connection configured to be connected to the external device;

a first protector that holds the first electrode connection of the first external connection bus bar;

a second protector that is arranged at an interval from the first protector and holds the first external connection of the first external connection bus bar; and an intermediate protector that is located between the first protector and the second protector and holds the intermediate structure of the first external connection bus bar between the first protector and the second protector, wherein the intermediate protector is not formed integrally with the first protector and the second protector, and one end of the intermediate protector is held by the first protector and another end of the intermediate protector is held by the second protector.

3. The external connection bus bar holding module according to claim 2, wherein the intermediate protector is made of synthetic resin that has been extrusion molded.

4. The external connection bus bar holding module according to claim 1, wherein the intermediate protector is formed integrally with the first protector and the second protector.

5. The external connection bus bar holding module according to claim 1, wherein the first output electrode terminal includes an electrode terminal of one polarity of a power storage element located at one end in an alignment direction of the plurality of power storage elements in the power storage element group, the second output electrode terminal includes an electrode terminal of another polarity of a power storage element located at another end in the alignment direction of the plurality of power storage elements in the power storage element group, the intermediate structure of the first external connection bus bar has a shape that extends from the first electrode connection to the first external connection, and the second protector holds the second external connection bus bar.

6. A battery connection module configured to be attached to an upper portion of a power storage element group, comprising:

the external connection bus bar holding module according to claim 1;

a plurality of terminal bus bars that connect the positive electrode terminals and the negative electrode terminals of adjacent power storage elements; and an insulating protector that holds the plurality of terminal bus bars, wherein the external connection bus bar holding module is arranged above the insulating protector.

7. The battery connection module according to claim 6, further comprising a cover that covers at least the first external connection bus bar excluding the first external connection, the second external connection bus bar excluding the second external connection, and the plurality of terminal bus bars.

8. The external connection bus bar holding module according to claim 1, wherein the first external connection of the first external connection bus bar and the second external connection of the second external connection bus bar are disposed at opposite ends of the external connection bus bar holding module from each other.

9. The external connection bus bar holding module according to claim 1, wherein the first external connection of the first external connection bus bar and the second external connection of the second external connection bus bar are disposed at opposite first ends of the external connection bus bar holding module from each other in a first direction that is a direction along which the intermediate protector extends, and the first external connection of the first external connection bus bar and the second external connection of the second external connection bus bar are disposed at opposite second ends of the external connection bus bar holding module from each other in a second direction that is perpendicular to the first direction.

10. The external connection bus bar holding module according to claim 1, wherein the intermediate protector holds the intermediate structure of the first external connection bus bar between the first protector and the second protector without holding any part of the second external connection bus bar.

11. The external connection bus bar holding module according to claim 2, wherein the first external connection of the first external connection bus bar and the second external connection of the second external connection bus bar are disposed at opposite ends of the external connection bus bar holding module from each other.

12. The external connection bus bar holding module according to claim 2, wherein the first external connection of the first external connection bus bar and the second external connection of the second external connection bus bar are disposed at opposite first ends of the external connection bus bar holding module from each other in a first direction that is a direction along which the intermediate protector extends, and the first external connection of the first external connection bus bar and the second external connection of the second external connection bus bar are disposed at opposite second ends of the external connection bus bar holding module from each other in a second direction that is perpendicular to the first direction.

13. The external connection bus bar holding module according to claim 2, wherein the intermediate protector holds the intermediate structure of the first external connection bus bar between the first protector and the second protector without holding any part of the second external connection bus bar.

* * * * *